(12) United States Patent
Speight

(10) Patent No.: US 7,303,096 B2
(45) Date of Patent: Dec. 4, 2007

(54) LIQUID DELIVERY SYSTEM

(75) Inventor: Christopher Speight, Katanning (AU)

(73) Assignee: The Water Corporation, Western (AU), (part interest)

( * ) Notice: Subject to any disclaimer, the term of this patent is extended or adjusted under 35 U.S.C. 154(b) by 240 days.

(21) Appl. No.: 11/142,620

(22) Filed: May 31, 2005

(65) Prior Publication Data

US 2005/0279772 A1    Dec. 22, 2005

Related U.S. Application Data

(63) Continuation-in-part of application No. 10/221,284, filed as application No. PCT/AU01/00269 on Mar. 12, 2001, now Pat. No. 7,007,828.

(30) Foreign Application Priority Data

Mar. 10, 2000  (AU) ..................... PQ6162

(51) Int. Cl.
    *B67D 5/08*    (2006.01)
(52) U.S. Cl. ............ 222/64; 222/69; 222/143; 222/333; 222/385; 222/481.5; 417/44.9; 417/283; 417/306; 417/423.3
(58) Field of Classification Search ............ 222/52, 222/64, 67, 69, 53, 481.5, 482, 333, 385, 222/387, 94, 136, 143; 417/44.9, 306–309, 417/283, 435, 423.3
    See application file for complete search history.

(56) References Cited

U.S. PATENT DOCUMENTS

| | | |
|---|---|---|
| 3,788,554 A | 1/1974 | Guise |
| 3,957,399 A | 5/1976 | Siczek |
| 4,518,009 A | 5/1985 | Schiemann |
| 4,545,735 A | 10/1985 | Ims |
| 4,616,982 A | 10/1986 | Quarve |
| 5,383,574 A * | 1/1995 | Raphael ..................... 222/1 |
| 5,480,063 A | 1/1996 | Keyes et al. |

(Continued)

FOREIGN PATENT DOCUMENTS

DE    1 073 795    1/1960

(Continued)

OTHER PUBLICATIONS

Derwent Abstract Accession No. 95-059306/08 & SU 1831467, 1993.

*Primary Examiner*—Frederick C. Nicolas
(74) *Attorney, Agent, or Firm*—Merchant & Gould P.C.

(57) ABSTRACT

A liquid delivery system includes a first reservoir having a first outlet through which liquid is delivered. A first delivery outlet is located at the lower portion of the first reservoir and a vent is included at its upper portion. A second reservoir located above the first reservoir and has a second outlet located in its lower portion. A first delivery conduit connects the second outlet to the first reservoir and a second delivery conduit connects the upper portion of the first reservoir with the upper portion of the interior of the second reservoir. A vent valve controls communication through the second delivery conduit. A level sensor senses the level of liquid in the first reservoir and causes the vent valve to open when the liquid falls below a first predetermined level and to close the vent valve when on the level rises above a second (higher) predetermined level.

38 Claims, 15 Drawing Sheets

U.S. PATENT DOCUMENTS 5,641,006 A    6/1997  Autrey et al.
7,007,828 B2 * 3/2006  Speight .................... 222/385

FOREIGN PATENT DOCUMENTS

| DE | 32 10 821 | 10/1983 |
|----|-----------|---------|
| DE | 33 18 120 | 11/1983 |
| DE | 37 10 141 | 10/1988 |
| DE | 44 17 213 | 11/1995 |
| FR | 2 230 978 | 12/1974 |
| GB | 898 870   | 6/1962  |
| GB | 981 334   | 1/1965  |
| NL | 8400518   | 9/1985  |
| WO | WO 98/50699 | 11/1998 |

* cited by examiner

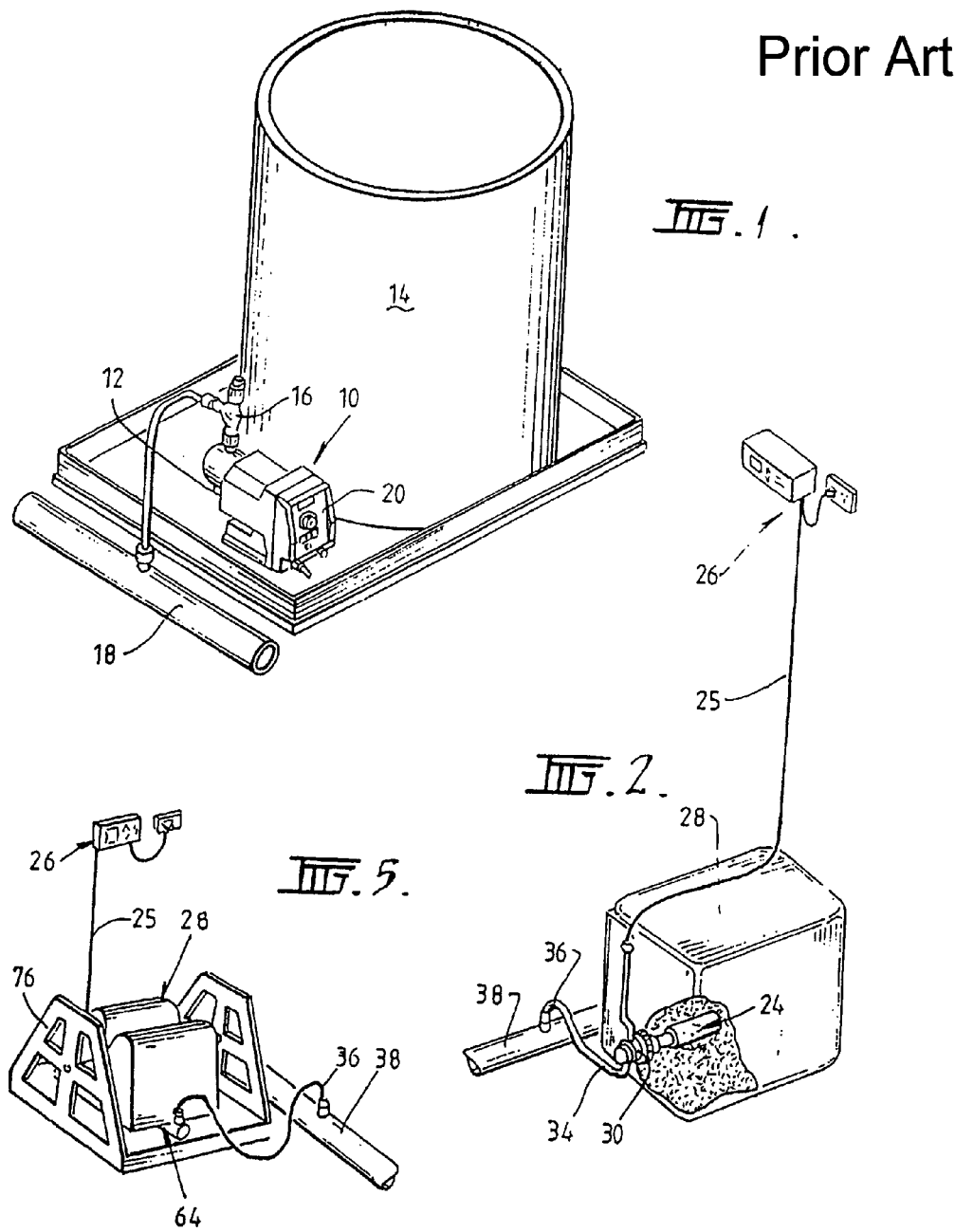

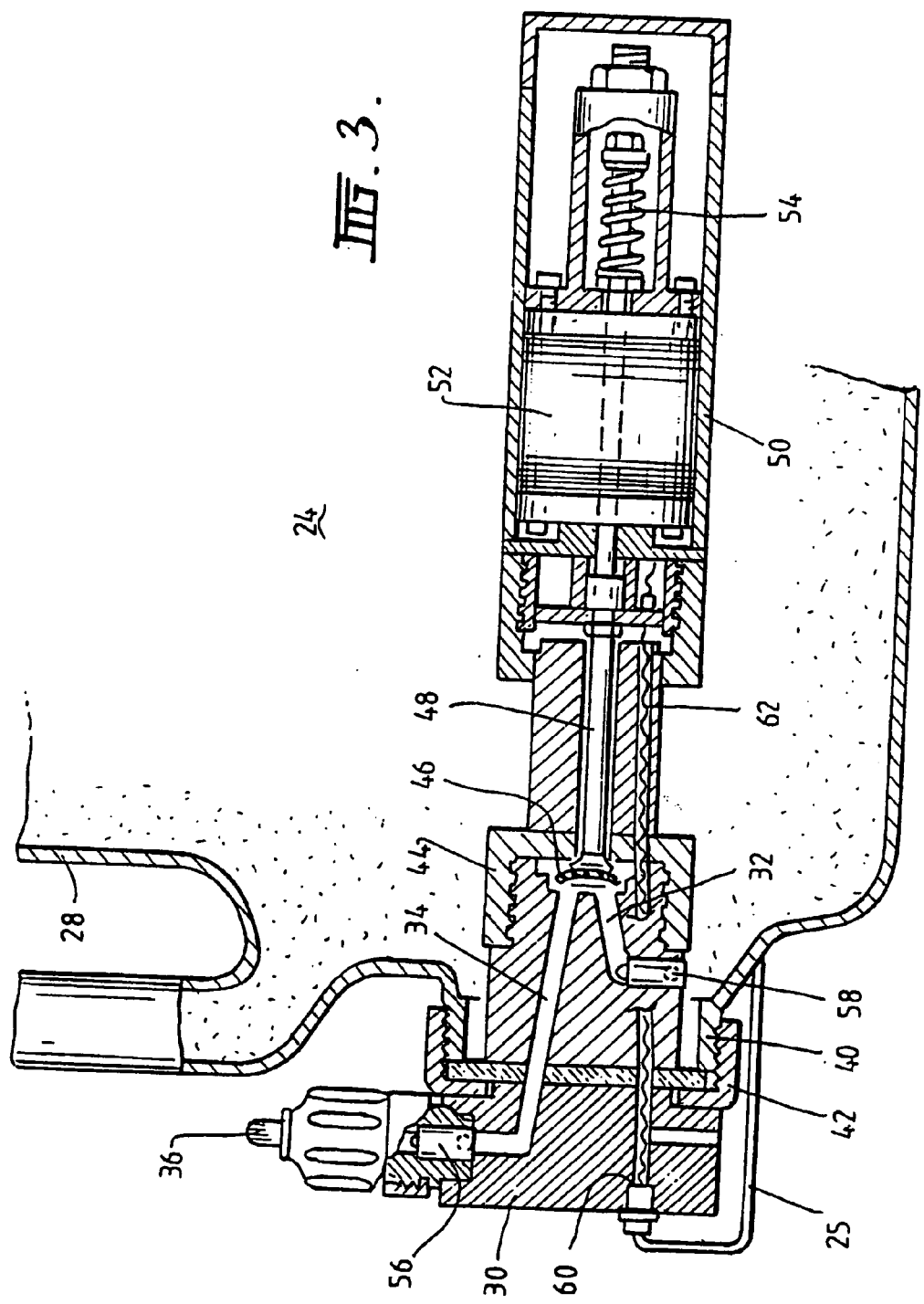

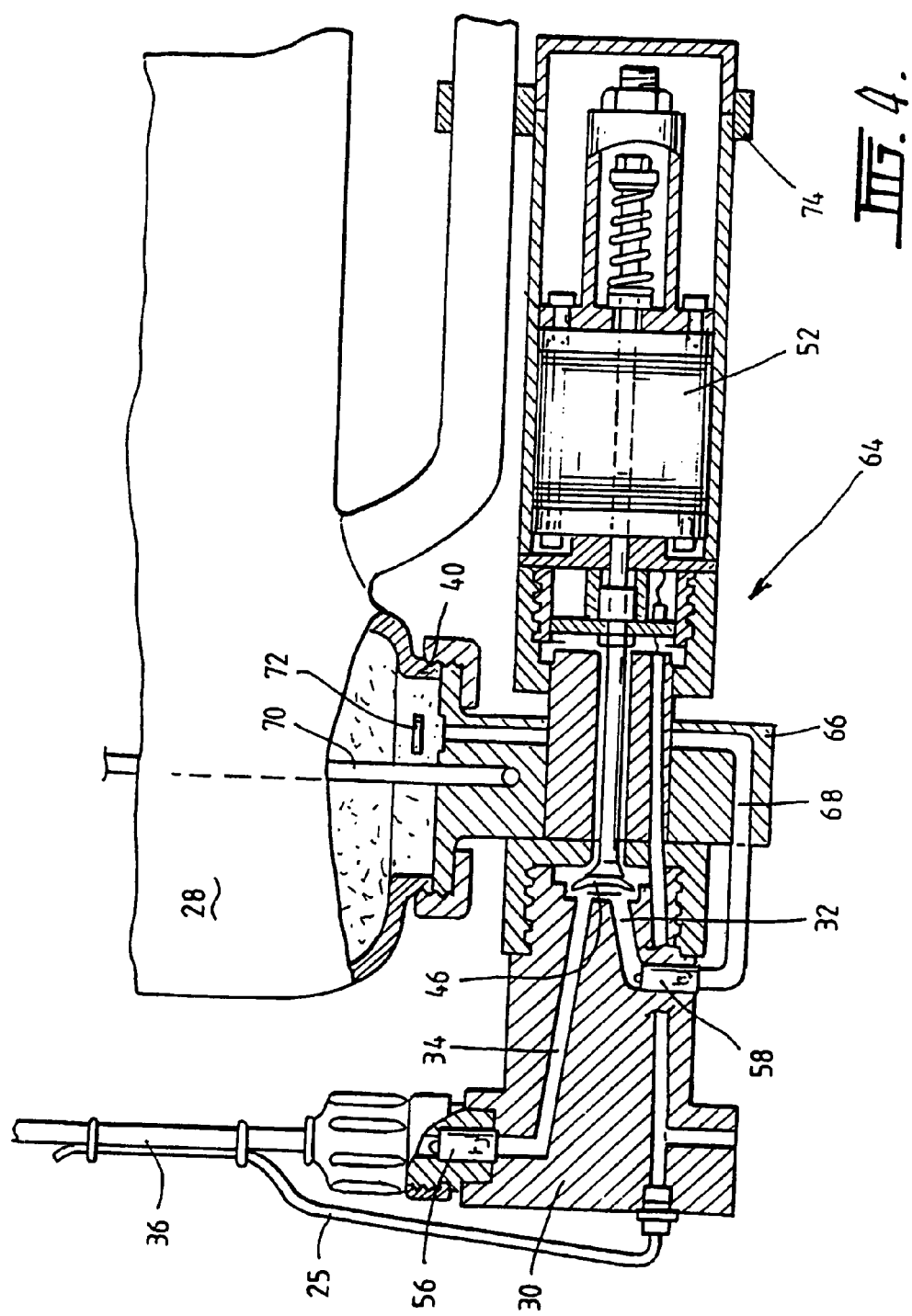

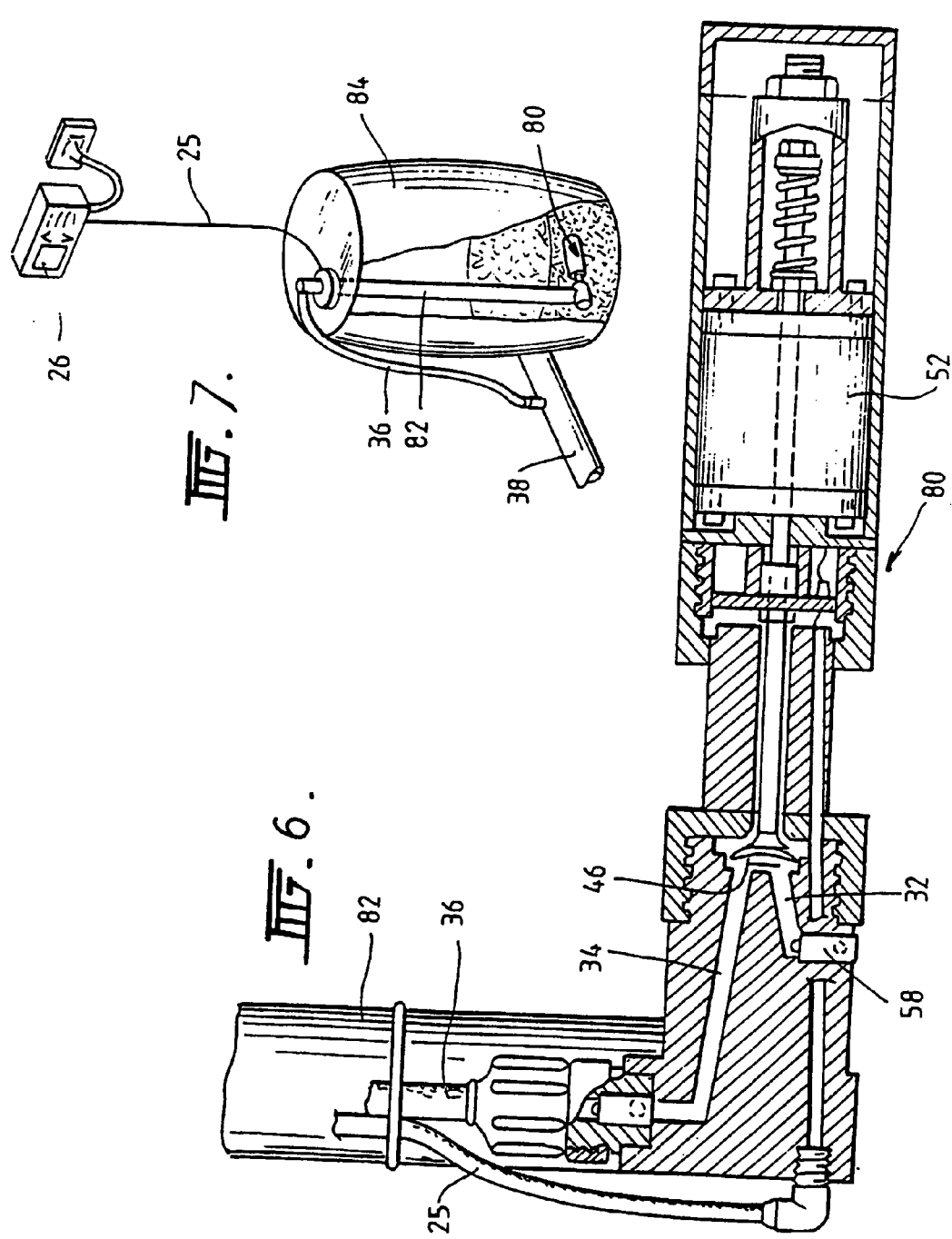

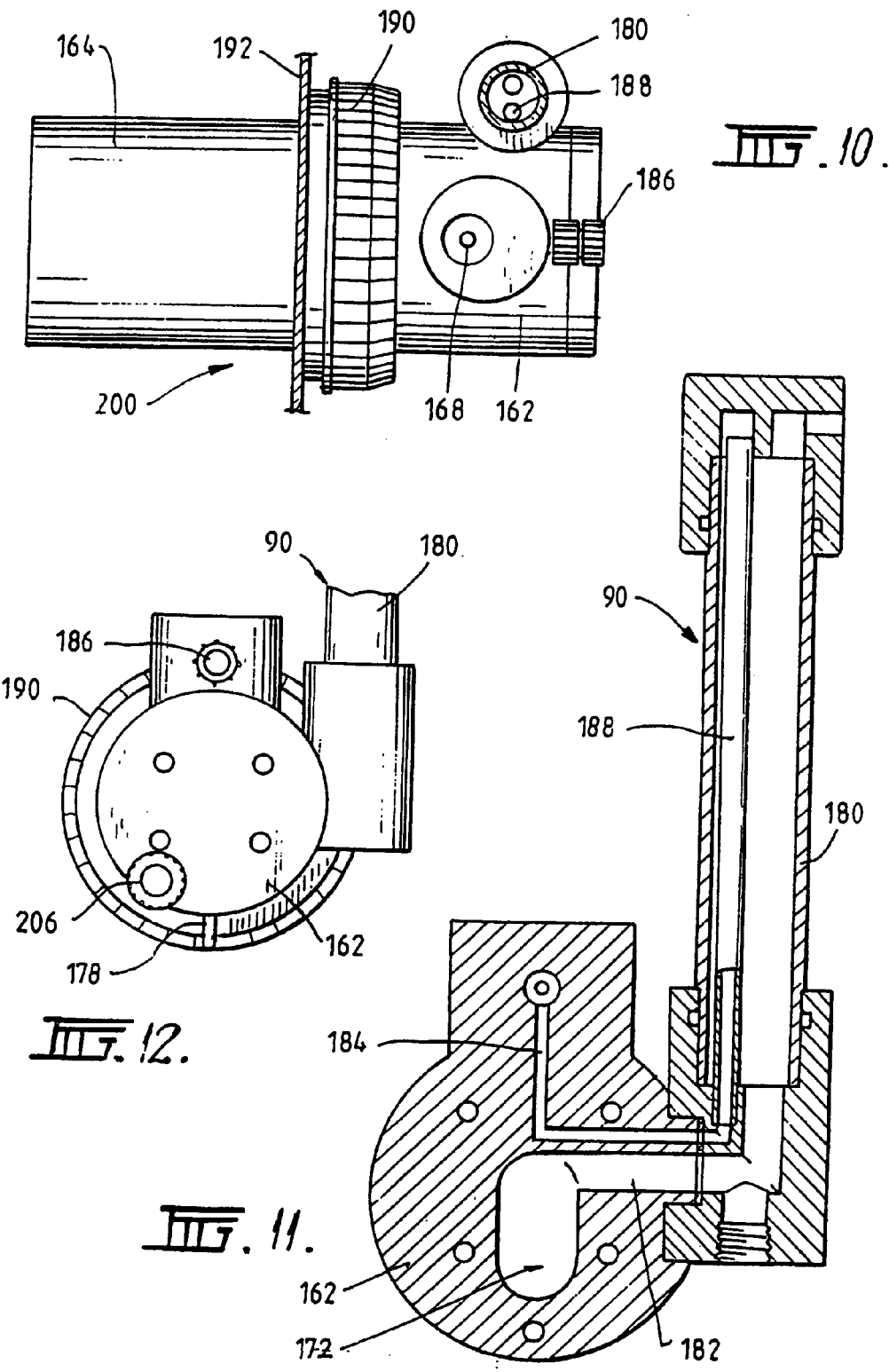

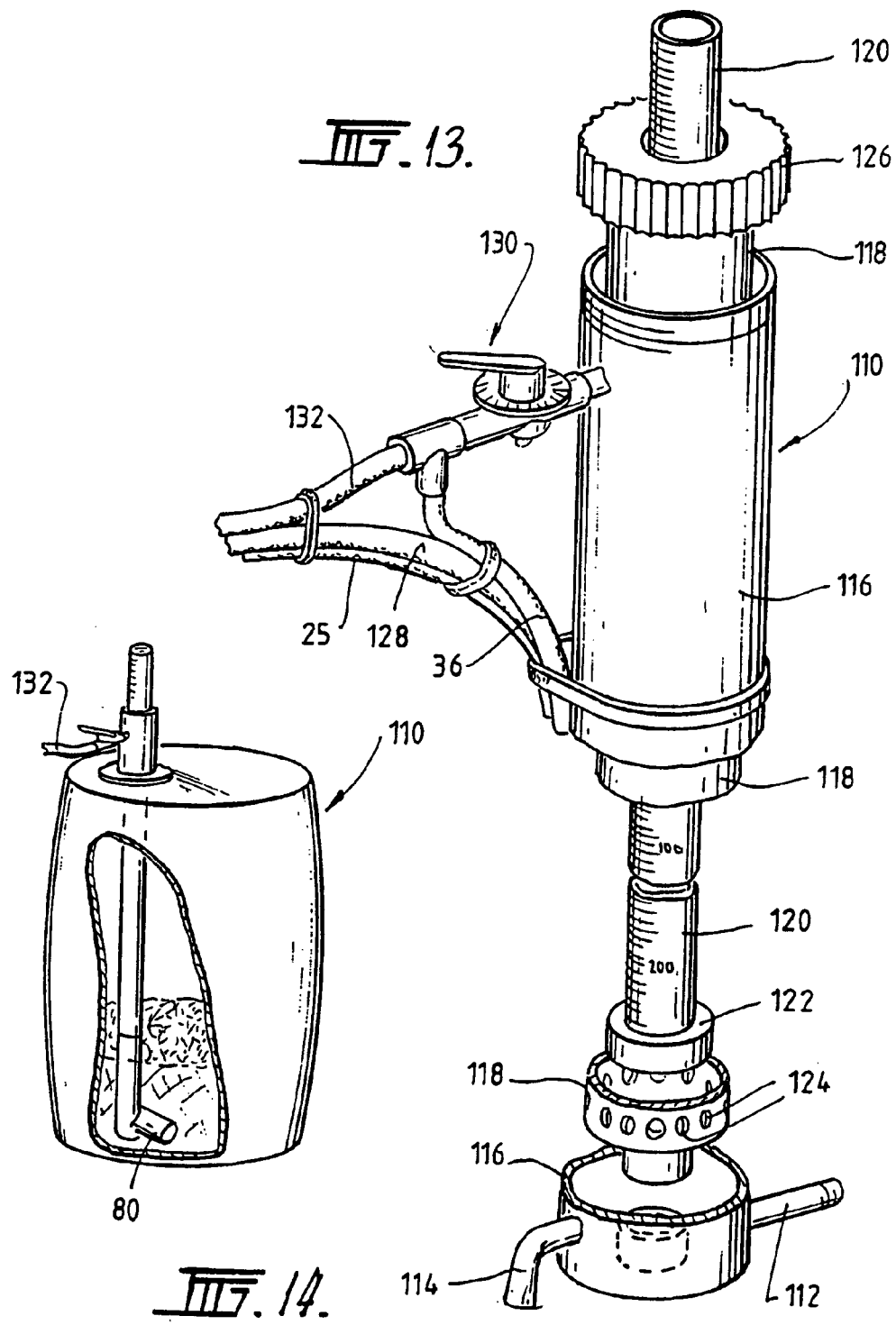

LIQUID DELIVERY SYSTEM

This application is a Continuation-in-Part of application Ser. No. 10/221,284, filed Sep. 9, 2002 now U.S. Pat. No. 7,007,828, which application is incorporated herein by reference.

FIELD OF THE INVENTION

The present invention relates to the delivery of liquids and on particular a liquid delivery system, which facilitates the refilling of a delivery container.

BACKGROUND

In many regional country town water supplies the only economical way that hazardous chemicals can be delivered to water treatment plants is by portable chemical containers (20 to 40 liter capacity). More often than not, a chemical metering pump, which accurately meters the required amount of chemical into the water, needs many times the capacity of a single container and therefore a vat is used in which the chemical is stored. The main problems associated with manually handling the chemical from the portable containers to the vats is that it is a slow, laborious and hazardous task for treatment plant operators. Whilst a number of methods have been introduced to reduce the time and risks involved, the exercise of "double handling" of the liquid chemical still remains a significant problem.

Other users of hazardous liquid chemicals, such as farmers, who also have a need to accurately meter a wide range of chemicals into water, also have major problems with this "double handling" process. Here again, a number of initiatives have been proposed to reduce the time and risks involved in transferring hazardous chemicals from portable containers into vats and tanks. These initiatives include battery-operated transfer pumps, purpose-built stands with special chemical syphons and innovative vortex systems, all of which improve the process, but do not remove the "double handling" problem.

DISCLOSURE OF THE INVENTION

Accordingly the invention resides in a liquid delivery system comprising a first reservoir having first outlet and a liquid delivery means for delivery of liquid from the first reservoir through the first outlet, the first outlet located at the lower portion of the first reservoir, the first reservoir having a vent at its upper portion which is open to atmosphere, a second reservoir located above the first reservoir and having a second outlet located in its lower portion, a first delivery conduit connecting the second outlet to the first reservoir, a second delivery conduit interconnecting the upper portion of the interior of the first reservoir with the upper portion of the interior of the second reservoir above the level of liquid in the second reservoir, a vent valve controlling communication through the second delivery conduit, a level sensor provided with the first reservoir and adapted to sense the level of liquid in the first reservoir, the sensor associated with the vent valve to cause the vent valve to open upon the level of liquid falling below a first predetermined level and to close vent valve on the level rising above a second predetermined level where the first predetermined level is lower than the second predetermined level.

According to a preferred feature of the invention the second reservoir comprises a plurality of second reservoirs each second reservoir connected to the first reservoir by a first and second delivery conduit.

According to a preferred feature of the invention the first reservoir comprises a plurality of containers each having a common upper level and each having a first outlet wherein one container has one first outlet lower than the other first outlets, the liquid delivery means being associated with the one first outlet and the other first outlets being connected to the one container.

According to a preferred feature of the invention each container is associated with the second reservoir.

According to a preferred feature of the invention wherein the liquid delivery means comprises an adaptor which is adapted to sealingly close the first outlet, the adaptor supporting a housing, said housing having a pumping chamber which is at least in part defined by a flexible diaphragm, the space defined by face of the diaphragm and which is remote from the pumping chamber being vented to atmosphere, an inlet providing communication between the interior of the first reservoir and the pumping chamber and an outlet providing communication between the pumping chamber and a delivery line, wherein in use said pumping chamber is located in relation to the inlet to be constantly filled with said liquid, the housing supporting an actuator operatively connected to the diaphragm through said space and adapted to reciprocate to cause flexing of the diaphragm in the pumping chamber to induce liquid flow from the inlet to the pumping chamber and from the pumping chamber to the outlet, a control means located remote from the first reservoir and adapted to control the actuator.

According to preferred feature of the invention the liquid delivery means comprises an adaptor which is adapted to sealingly close the first outlet, the adaptor supporting a housing, said housing having an inlet, an outlet and a cavity which accommodates a flexible diaphragm, the diaphragm at least partially defining a pumping chamber within the cavity to one side of the diaphragm and a space within the cavity to the other side of the diaphragm, the space being vented to atmosphere, the inlet opens directly into the interior of the first reservoir and the pumping chamber and the outlet providing communication between the pumping chamber and a delivery line, the inlet and the outlet each having a one way valve, wherein in use the housing is located such that the housing is below the intended lowermost level of liquid in the first reservoir and the outlet is located above the inlet; and the housing supporting an actuator and an associated actuating element which is operatively connected to the diaphragm through said space, said actuator being caused to reciprocate as result of the sequential activation of the actuator to cause flexing of the diaphragm in the pumping chamber to induce liquid flow from the inlet to the pumping chamber and from the pumping chamber to the outlet of the housing, a control means located remote from the first reservoir and adapted to control the actuator.

According to preferred feature of the invention the liquid delivery means comprises:

an adaptor which is adapted to sealingly close the first outlet, the adaptor supporting a housing;

said housing having an inlet, an outlet and a cavity which accommodates a flexible diaphragm, the diaphragm at least partially defining a pumping chamber within the cavity to one side of the diaphragm and a space within the cavity to the other side of the diaphragm, the space being vented to atmosphere;

the inlet opens directly into the interior of the first reservoir and the pumping chamber and the outlet providing communication between the pumping chamber and a delivery line, the inlet and the outlet each having a one way valve, wherein in use the housing is located such that the housing is below the intended lowermost level of liquid in the first reservoir and the outlet is located above the inlet;

the housing supporting a solenoid and an associated actuating element which is operatively connected to the diaphragm through said space, said actuator being caused to reciprocate as result of the sequential activation of the solenoid to cause flexing of the diaphragm in the pumping chamber to induce liquid flow from the inlet to the pumping chamber and from the pumping chamber to the outlet of the housing, a control means located remote from the first reservoir and adapted to control the solenoid; and a calibration arrangement comprising a bypass duct connected to the outlet, a calibration chamber connected to the bypass duct, an adjustable valve which is adapted to vary the communication between the outlet and the calibration chamber, the calibration chamber in use supported to be exterior of the first reservoir and to extend above the housing to have a height at least equal to the maximum height of the liquid in the first reservoir, the upper portion of the calibration chamber is open to the atmosphere, the inlet communicating with the calibration chamber, a measuring means provided in association with the calibration chamber to enable the volume of liquid in the calibration chamber to be monitored, the calibration chamber being connected to the inlet, the arrangement further comprising a control valve associated with the inlet and adapted to control the flow of fluid from the first reservoir to the pumping chamber.

According to preferred feature of the invention the liquid delivery means comprises:

an adaptor which is adapted to sealingly close the first outlet, the adaptor supporting a housing;

said housing having an inlet, an outlet and a cavity which accommodates a flexible diaphragm, the diaphragm at least partially defining a pumping chamber within the cavity to one side of the diaphragm and a space within the cavity to the other side of the diaphragm, the space being vented to atmosphere;

the inlet opens directly into the interior of the first reservoir and the pumping chamber and the outlet providing communication between the pumping chamber and a delivery line, the inlet and the outlet each having a one way valve, wherein in use the housing is located such that the housing is below the intended lowermost level of liquid in the first reservoir and the outlet is located above the inlet;

the housing supporting a solenoid and an associated actuating element which is operatively connected to the diaphragm through said space, said actuator being caused to reciprocate as result of the sequential activation of the solenoid to cause flexing of the diaphragm in the pumping chamber to induce liquid flow from the inlet to the pumping chamber and from the pumping chamber to the outlet of the housing, a control means located remote from the first reservoir and adapted to control the solenoid; and a calibration arrangement comprising a bypass duct connected to the outlet, a calibration chamber connected to the bypass duct, an adjustable valve which is adapted to vary the communication between the outlet and the calibration chamber, the calibration chamber in use supported to be exterior of the first reservoir and to extend above the housing to have a height at least equal to the maximum height of the liquid in the first reservoir, the upper portion of the calibration chamber is open to the atmosphere, the inlet communicating with the calibration chamber, a measuring means provided in association with the calibration chamber to enable the volume of liquid in the calibration chamber to be monitored, the calibration chamber being connected to the inlet, the arrangement further comprising a control valve associated with the inlet and adapted to control the flow of fluid from the first reservoir to the pumping chamber.

According to a preferred feature of the invention the reservoirs are supported in a cradle, the cradle pivotally supported from a base to be movable between a first position at which the first outlet is uppermost and a second position at which the first outlet is located towards the lower extent of the first reservoir when at the second position and the second reservoir is supported from above the first reservoir. According to a preferred feature of the invention the cradle is displaced through substantially 90° in its movement between the first and second positions. According to a preferred feature of the invention the cradle is adapted to support a plurality of containers in a side-by-side relationship.

BRIEF DESCRIPTION OF THE DRAWINGS

In order to facilitate a more comprehensive understanding of the nature of the invention several embodiments of the chemical metering pump in accordance with the present invention will now be described in detail, by way of example only, with reference to the accompanying drawings, in which:

FIG. 1 illustrates a prior art electronic chemical metering pump;

FIG. 2 illustrates a first embodiment of a chemical metering pump according to the present invention in situ;

FIG. 3 is an enlarged section view of the chemical metering pump of FIG. 2;

FIG. 4 illustrates in section view a second embodiment of a chemical metering pump according to the present invention in situ;

FIG. 5 illustrates the chemical metering pump of FIG. 4 in a typical application;

FIG. 6 illustrates in section view a third embodiment of a chemical metering pump according to the present invention;

FIG. 7 illustrates the chemical metering pump of FIG. 6 in a typical application;

FIG. 10 is a plan view of the chemical metering pump of FIG. 9;

FIG. 11 is a front section view of the chemical metering pump of FIG. 9 with an integrated calibration system fitted;

FIG. 12 is a front view of the chemical metering pump of FIG. 9;

FIG. 13 illustrates a second embodiment of a calibration system for the chemical metering pump of FIGS. 6 and 7;

FIG. 14 illustrates the calibration system of FIG. 13 in situ;

DETAILED DESCRIPTION OF SPECIFIC EMBODIMENTS

Figure 8:
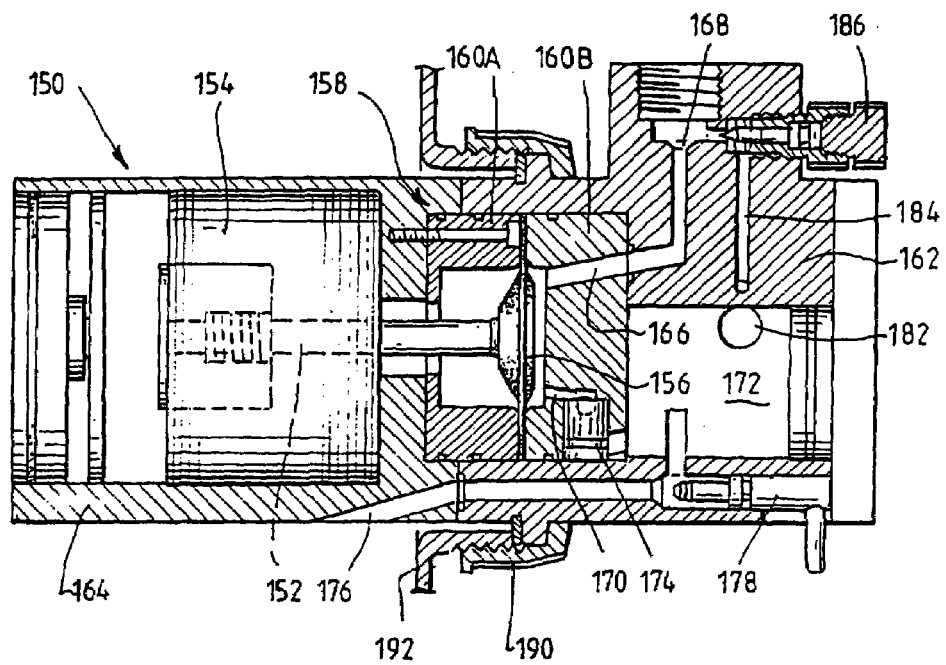
FIG. 8 illustrates in section view a fifth embodiment of a chemical metering pump incorporating a first embodiment of a calibration system.

A prior art electronic chemical metering pump 10 illustrated in FIG. 1 has an inlet 12 which draws liquid chemical from a vat 14 and a discharge valve 16 through which liquid chemical is metered to a flow stream 18. The pump 10 includes a built in electronic controller 20 for controlling the operation of the pump 10 so that it accurately meters the required volume of liquid chemical into the flow stream 18. The liquid chemical held in the vat 14 may be, for example, liquid chlorine (a concentrated solution of sodium hypochlorite) which is metered into the water supply flow stream 18 at the rate of between 0.05 to 10 liters/hour.

As noted above, one of the problems with this type of prior art metering system, is that the vat 14 must be periodically refilled with liquid chemical. This task is done manually, and in addition to being laborious and time consuming, may also be dangerous, particularly when handling hazardous chemicals.

FIG. 2 illustrates a first embodiment of a chemical metering pump 24 in accordance with the present invention. Instead of having an electronic controller built into the pump, a remote electronic controller 26 is provided (in this case shown as a wall-mounted unit), which is connected by cable to the chemical metering pump 24. The electronic controller 26 performs essentially the same function as the conventional electronic controller 20 of FIG. 1, however it differs from the prior art controller in that it is capable of safely transmitting a low voltage, variable, control signal to one or more chemical metering pumps via suitably screened cable(s). Furthermore, as it is preferably mounted in a separate, wall-mounted unit, it can be positioned in a more convenient environment, such as a plant control room, where it can be viewed (at eye level) and adjusted in total safety and isolation from the pumping installation.

The chemical metering pump 24 of the first embodiment overcomes the problem of "double handling" by being itself adapted to be connected directly to an outlet of a chemical transport/storage container 28. For this purpose, the pump 24 comprises a discharge adaptor 30 for connecting the pump to an outlet of the container 28 and providing a closure for the container. The discharge adaptor 30 has an intake port 32 (see FIG. 3) adapted to be in fluid communication with the interior of the container 28, and a discharge port 34 adapted to be in fluid communication with a discharge tube 36 leading to a flow stream 38.

As can be seen more clearly in FIG. 3, the chemical metering pump 24 of the first embodiment is in the form of a submersible pump capable of being submerged in the liquid chemical within the container 28. As shown in FIG. 3, the discharge adaptor 30 has a substantially cylindrical body adapted to be received in the outlet aperture 40 of the container 20, and it is held in sealing relationship with the aperture by a suitable screw-threaded connector 42. Once the cable 25 from controller 26 and the discharge tube 36 are connected, the container 28 is laid on its side as shown in FIG. 3. The pump 24 further comprises a housing 44 connected to the discharge adaptor 30 to define a pumping chamber defined in part by a diaphragm 46 provided therein for alternately drawing liquid by suction into the intake port 32 and pushing the liquid by compression out through the discharge port 34. The diaphragm 46 is driven by a connecting member 48 which is coupled to an actuator 50. In the first embodiment, the actuator 50 is an electrical solenoid actuator, having a core connected to the connector where a solenoid 52 causes the connecting member 48 to move in a reciprocating motion in response to a control signal from the controller 26. A coil spring 54 provided within the housing of the electrical actuator 50 pushes the diaphragm 46 via a connecting member 48 to a normally closed 25 position in which it forces liquid from the pumping chamber through the discharge port 34 and a discharge valve 56. However, when an electrical pulse activates the solenoid 52, the reciprocating member 48 is drawn backwards against the force of the spring 54 to move the diaphragm 46 to the open position in which it simultaneously draws fresh liquid chemical into the pumping chamber through an intake valve 58, which is in fluid communication with the liquid chemical in the container 30 28, and into the intake port 32. With each cycle of movement of the diaphragm 46, a precise volume of liquid chemical is metered from the container 28 to the discharge tube 36. The flow rate can be controlled by adjusting the rate at which electrical pulses are transmitted to the solenoid -7actuator 50 from the controller 26.

The discharge valve 56 and intake valve 58 are one way valves for controlling the flow of liquid out through the discharge port 34 and into the intake port 32 respectively. In the first embodiment both the intake valve 58 and discharge valve 56 are ball valves, in which a small ball bearing is normally held in the closed position by gravity or by a small spring. Discharge valve 56 prevents the liquid chemical from being drawn back into the discharge port 34 when the diaphragm 46 moves backwards, and intake valve 58 prevents the liquid chemical from flowing back out through the intake port 32 when the diaphragm 46 moves forward. Clearly, other suitable one way valves may be used to control the flow of liquid chemical through the intake and discharge ports.

The discharge adaptor 30 also includes a vent port 60 which extends into the diaphragm housing 44 for venting a space behind the diaphragm 46 to atmosphere. This allows the free movement of the diaphragm 46 under the influence of the connecting member. Preferably the vent port 60 also extends through the diaphragm housing 44 to the electrical actuator 50 and provides a path through which an electrical connector for connecting the actuator 50 to the remote controller 26 can pass. A wire 62 which passes through the vent port 60 connects the solenoid 52 to the cable 25. If the diaphragm 46 ruptures the vent port 60 allows the fluid to be vented to atmosphere, so that fluid does not flow into the actuator 50 and its flow from the vent port 60 provides an indication that the diaphragm 46 has failed.

As can be seen in FIG. 3, the discharge adaptor 30, diaphragm housing 44 and electrical actuator 50 are all arranged end to end in an elongate, cylindrical configuration having an outer diameter sufficiently small to allow the whole pump 24 to be inserted through the outlet aperture 40 of the container 28. The whole of the submersible pump assembly is encased in a chemically resistant shroud so as to be protected from the corrosive properties of the liquid chemical. In this manner, liquid chemical solution can be pumped directly from within the container 28 and metered through the discharge tube 36 to a flow stream in a most efficient manner. Furthermore the intake port 32 is located below the discharge port 34 and the flow path between the intake and outlet is constantly directed upwardly. This presents a significant advantage especially when the pump is in use with liquid chlorine since it is a characteristic of liquid chlorine, that chlorine gas will be generated to form bubbles in its liquid. The collection of the bubbles in the pumping chamber will inhabit the action of the pump. The configuration of the inlet port and discharge port enable such bubbles to move to the discharge port 34 and away from the pumping chamber.

FIG. 4 illustrates in section view a second embodiment of the chemical metering pump which is similar to the first embodiment illustrated in FIG. 3 except in this case the pump is not submerged in the chemical solution within the container 28 but is supported from the outlet to lie outside of the container. The like parts in the pump 64 of this embodiment have been identified with the same reference numerals as in the pump 24 of FIG. 3 and will not be described in detail again. The principal difference in this embodiment is that the discharge adaptor 30 is provided with a secondary location adaptor 66 for connecting the pump to the outlet aperture 40 of the container 28. The secondary location adaptor 66 is formed with an inlet port 68 for connecting the intake port 32 in the discharge adaptor 30 in fluid communication with the liquid chemical in the container 28.

The secondary location adaptor 66 is also provided with a vent tube 70 adapted to extend from the exterior of the second adaptor and into the container to extend upwards into the container 28 to a point above the level of liquid chemical within the container 28 (when inverted). Vent tube 70 allows air from the atmosphere to enter the container 28 so as to avoid the formation of a vacuum within the container during metering of chemical solution via pump 64. Optionally, a filter member 72 may be provided in the inlet port 68 so as to prevent any sediment which may settle to the bottom of the container 28 from entering the flow stream via the chemical metering pump 64. A handle bracket 74 is provided for supporting the pump 64 from the handle of the container 28 when the container is in its inverted position.

FIG. 5 illustrates the chemical metering pump 64 of FIG. 4 in a typical application in which liquid chemical is metered from the container 28 to a flow stream 38 under the control of a remote electronic controller 26. In this case, the container 28 is held in a specially designed cradle 76 with built-in bunding tray. Cradle 76 enables the container 28 to be rotated from an upright position, in which the pump 64 can be fitted to the outlet aperture of the container in the manner illustrated in FIG. 4, to an inverted position as shown in FIGS. 4 and 5 ready for metering. Cradle 76 reduces the time and labor involved in replacing an empty container with a full container of liquid chemical, since the full weight of the container 28 is at all times supported in the cradle 76 while the pump 64 is being fitted to the outlet aperture.

FIG. 6 illustrates in section view a third embodiment of the chemical metering pump 80. The third embodiment is substantially identical in construction to the first embodiment illustrated in FIG. 3, and therefore the like parts have been identified with identical reference numerals as in FIG. 3, and will not be described again in detail. The third embodiment of the pump 80 is also designed to be fully submersible but in this case it is suspended by means of a support member 82 within a large chemical storage container, (for example, a 200 liter drum) as illustrated in FIG. 7. The support member 82 is adapted to hold the pump assembly 80 within close proximity to a floor of the drum 84 and is fixed at its top end to the outlet aperture of the drum 84.

The support member 82 may be, for example, a hollow PVC conduit, and the discharge tube 36 from the discharge port 34 of the pump is accommodated within the conduit 82. The cable 25 is also supported by the support member 82 and is lead out through the outlet aperture to the controller 26. In other respects, the operation of the submersible chemical metering pump 80 of this embodiment is substantially identical to that of FIG. 3.

FIG. 8 illustrates in sectional view, a fourth embodiment of a chemical metering pump 150 in accordance with the present invention. The fourth embodiment of the chemical metering pump 150 is of more compact construction and incorporates several additional innovative features compared to the previous embodiment. As in the previous embodiment, a reciprocating member 152 is adapted to be driven by a solenoid 154 which causes the reciprocating member 152 to move in a reciprocating motion in response to a control signal from the remote controller (not illustrated). A diaphragm 156, driven by the reciprocating member 152, is provided within a diaphragm housing 158.

In the fourth embodiment, the diaphragm housing is formed by a pair of removable diaphragm housing inserts 160A and 160B that are held in sealing relationship in a chamber formed partly within the discharge adaptor 162 and partly within the solenoid housing 164. The removable inserts 160A and 160B together define the internal volume of the diaphragm housing 158, and thereby the capacity of the pumping chamber of the pump and the space to the rear of the diaphragm. Furthermore, inserts 160A and 160B can also be formed with a variety of configurations of inlet and outlet ports pumping chamber volumes depending on the particular application of the pump and discharge capacity of the pump. Thus, for example, in the embodiment of FIG. 8, insert 160B is formed with a discharge port 166 that aligns with a discharge port 168 provided in the discharge adaptor 162. Insert 160B is also formed with an intake port that is in fluid communication with a pump reservoir 172 via one-way ball valve 174. The pump reservoir 172 is in fluid communication with liquid chemical in the container via a transfer port 176 (suction). The transfer port 176 can be closed off by means of a transfer valve 178, which is slidably moveable between an open position (as shown in FIG. 8) and a closed position. The pump reservoir 172 is also in fluid communication with a sight tube 180 (see FIG. 11) of the calibration system via sight tube connecting port 182. A by-pass port 184 is provided within the body of the discharge adaptor 162 and is provided with a by-pass control valve 186. By-pass port 184 provides fluid communication between the discharge port 168 and the bottom of the sight tube by-pass tube 188 (see FIG. 11). The sight tube by-pass tube 188 is open to atmosphere at its upper end and overflows into the sight tube 180.

The pump is configured to accommodate for the generation of the bubbles in the liquid being pumped. This is achieved in the reservoir by the intake port from the reservoir of the pumping chamber being lower in the reservoir reducing the likelihood of bubbles being carried to the intake port. In addition the intake port is located lower than the discharge port and both are generally upwardly directed which facilitates the movement of bubbles from the pumping chamber. In addition the reservoir is vented to atmosphere through the sight tube connecting port 182 and the sight tube 180 and the connection to the sight tube connecting port is located at the upper portion of the reservoir.

As can be seen most clearly in FIG. 10, the discharge adaptor is provided with a screw threaded connector 190 adapted to screw onto the threaded outlet aperture in the wall of liquid container 192. The operation of this embodiment of the pump 150 is similar to that of the previous embodiments, and will not be described again.

Figure 9:
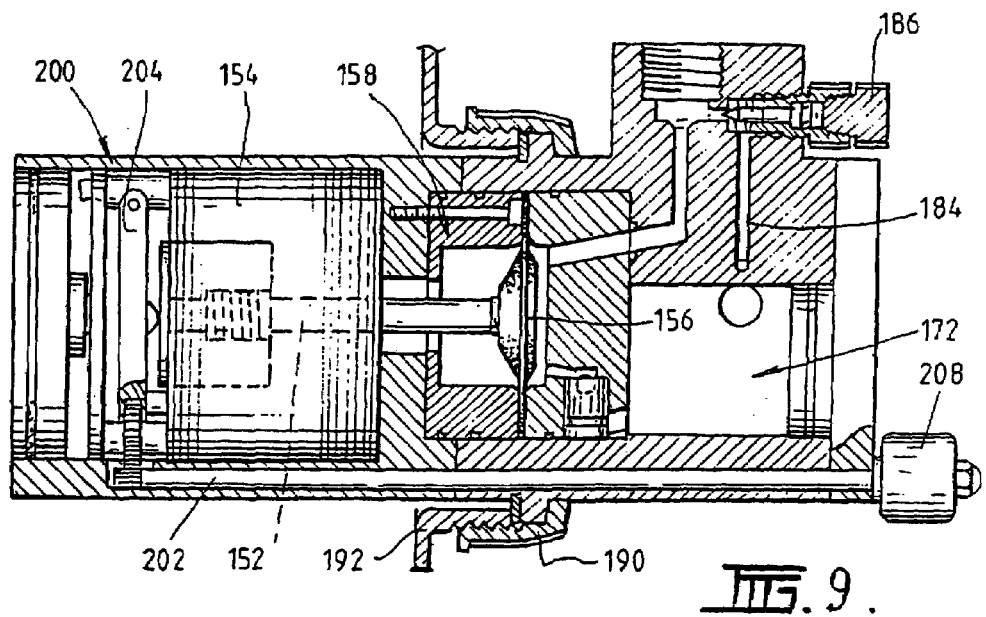
FIG. 9 illustrates in section view a fifth embodiment of a chemical metering pump according to the present invention.

FIG. 9 illustrates a fifth embodiment of the chemical metering pump 200 which in many respects is similar to the pump 150 of the previous embodiment. However, pump 200 is also provided with a stroke adjuster 202 for adjusting the stroke of the reciprocating member 152, and thereby providing another means for adjusting the volume of liquid metered by the pump 200. Stroke adjuster 202 comprises a solenoid stroke limiter 204 which is pivotally mounted at the rear of the solenoid 154. The position of the solenoid stroke limiter can be varied by turning a stroke adjuster knob 206 provided on the front face of the pump 200. In other respects, the pump 200 is substantially identical to the pump 150 of the previous embodiment, and the similar parts have been identified with the same reference numerals.

In order to determine the rate at which chemical solution is metered from the container 28 to a flow stream 38, an integrated calibration system 90 has been developed for use in connection with the chemical metering pumps 150 and 200 illustrated in FIGS. 8 and 9.

As can be seen most clearly in FIGS. 8, 9 and 12, the calibration system 90 includes the transfer valve 178, (shown in FIG. 8 in the open position). When the transfer valve 178 is in the open position, the pump reservoir 172 is flooded with liquid chemical from the container 28. The calibration system 90 operates in the following manner. With both transfer valve 178 and bypass control valve 186 fully open (maximum), chemical solution transfers from the container into the calibration system via transfer port 176 and into the reservoir 172, filling the calibrated sight tube 180 via the sight tube connecting port 182 (see FIG. 11). The level of the chemical solution in the sight tube 180 will be the same as the level of chemical solution within the container 28 (sight tube 180 extends the full height of the container 28). The electronic controller 26 is then switched on and the pulse rate set to maximum so that the pump 150 or 200 will commence circulating liquid chemical into the sight tube 180 via by-pass tube 188.

The transfer valve 178 is then moved to the fully closed position, (and where additional containers are connected, an auxiliary valve is also closed), and by-pass control valve 186 is partially closed until the product level in sight tube begins to fall. This indicates that liquid chemical is now being discharged into the flow stream 38 via discharge tube 36. To determine the rate at which product is being discharged into the flow stream, the rate at which the level of product in the sight tube 180 descends is timed against the calibration scale (milliliters per minute). If the discharge rate is lower than the rate required, the bypass control valve 186 can be adjusted and calibration repeated until the desired rate is achieved. Once the desired rate is achieved, the transfer valve 178 is opened and the pump is ready for operation.

The above described calibration system can be readily adapted to conventional forms of metering pumps. It is ideal for either multiple chemical or single control use and also has the facility to eliminate vapor lock (where gaseous chemicals such as liquid chlorine are used). The reason for such is that the bypass valve is located at the upper end of the discharge outlet and the bypass line is vented to atmosphere through the bypass tube 188. Therefore any gaseous phase that is generated and is delivered to the bypass valve will tend to flow to the bypass line rather than the pressurised discharge line.

FIGS. 13 and 14 illustrate a second embodiment of the container calibration system 110, which can be used in connection with the submersible pump 80 according to the third embodiment illustrated in FIG. 6. The calibration system 110 replaces the support member 82 of FIGS. 6 and 7 and includes a tube 112 which is linked to the intake port 32 of the pump 80 and which supports the pump from the outer casing 116. The calibration system 110 comprises three concentric members, a hollow outer casing 116, a hollow inner valve stem 118 and a calibration indicator rod 120. The pump is supported by the lower end of the casing 116.

A float 122 is provided at the lower end of the calibration indicator rod 120 which is free to slide up and down within the inner valve stem 118. A series of connecting ports 124 are provided adjacent to the lower end of the inner valve stem 118 to allow the transfer of liquid chemical from within the outer casing 116 to within the inner valve stem 118. The lower end face of the casing is formed with an aperture 127 which is associated with a valve seat at its inner end. The lower force of the inner valve stem 118 is intended to be able to operate with the valve seat to close the aperture. The upper end of the inner tube stem cooperates with an annular nut 126 which is threadably engaged with the upper end of the outer casing 116. With rotation of this nut in one direction and the opposite direction the lower end of the inner valve stem 118 can be moved axially into and out of sealing engagement with the valve seat to control the flow of liquid to the pump from the container through the aperture 127. Attached to and supported by the outer casing 116 is the pump discharge tube 36, a pump vent tube 128 and the pump power supply/control signal cable 25 which are mounted to the pump. The pump discharge tube 36 is in fluid communication with the chamber formed within the outer casing 116 through a by-pass control valve 130 and a discharge line 132 via a T-junction.

The calibration system 110 operates as follows. With the inner valve stem 118 out of sealing engagement with the valve seat, liquid chemical product flows into the outer casing from the container through the aperture 127 and then to the pump. Both the outer casing 116 and the chamber within the inner valve stem 118 are flooded with liquid chemical product to the level of the liquid within the container. This causes the calibration indicator rod 120 to rise upwards within the valve stem chamber 118 to the same level as the liquid content of the container. By reading the calibrated scale marked on the rod 120 the volume of liquid chemical in the container can be measured.

To calibrate the pump, the by-pass control valve 130 is turned to the fully open position, and the electronic controller 26 is set with the pulse rate to maximum. The pump will then commence circulating liquid chemical product through the calibration system. The inner valve stem is then sealingly engaged with the valve seat associated with the aperture and the by-pass control valve 130 is partially closed until the indicator rod 120 starts to fall. The liquid chemical product is now being discharged into the flow stream. In order to determine the rate at which the product is being discharged, the rate at which the rod 120 descends is timed using the left calibrated scale in the rod in milliliters per minute. If the discharge rate is lower than the rate required, the setting of the by-pass control valve 130 is adjusted and the calibration process is repeated until the precise rate required is achieved. Once the desired discharge rate is achieved, the calibration flow valve is fully opened and the system is ready for normal operation.

Figure 15:
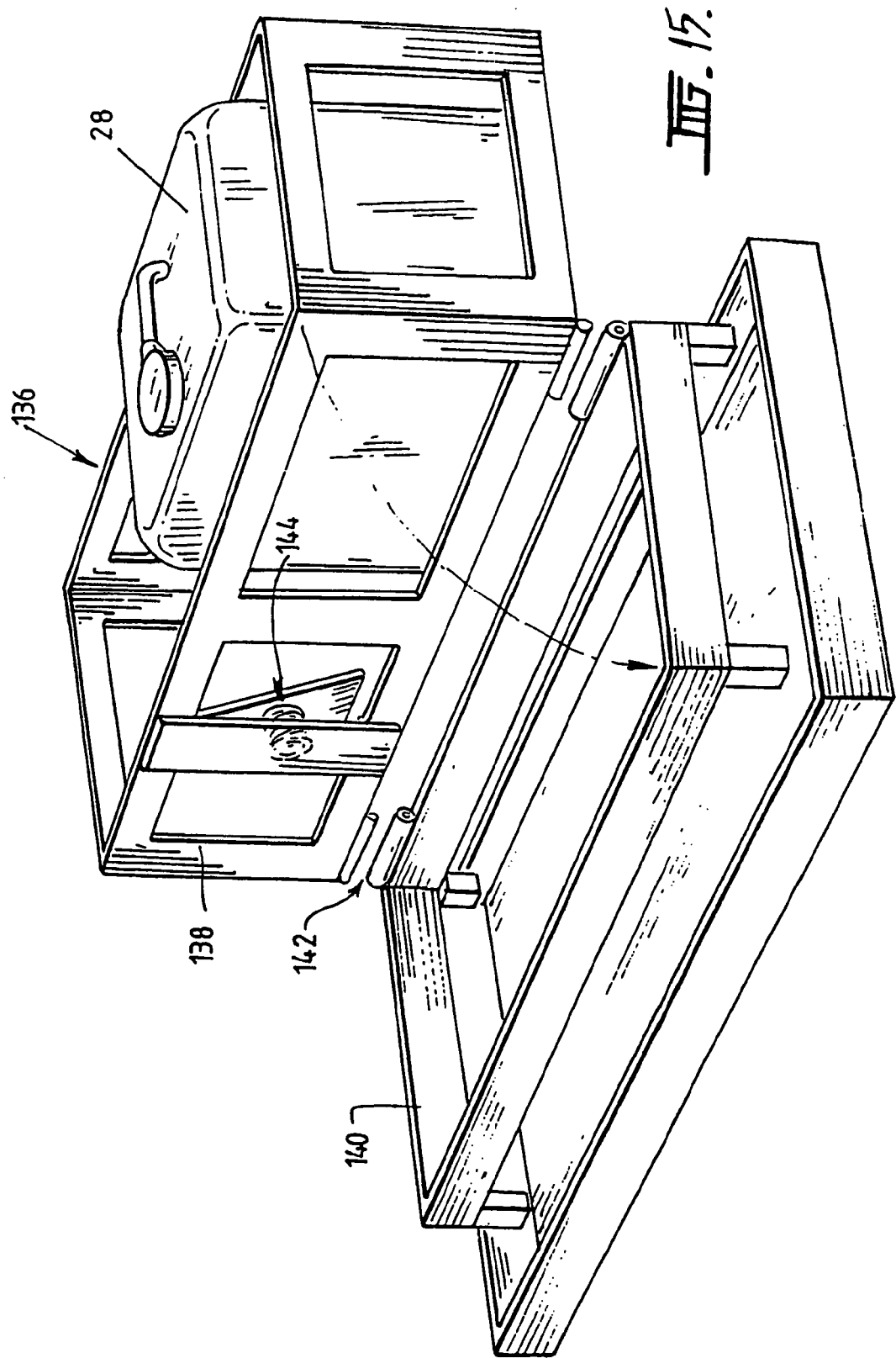
FIG. 15 illustrates another embodiment of a cradle for holding a container containing chemicals for metering.

FIG. 15 illustrates an alternative embodiment of a cradle for holding a liquid chemical container that may be used in conjunction with the chemical metering pump 24 as illustrated in FIGS. 2 and 3. The cradle 136 has a first pivotable support frame 138 that is pivotably connected to a base 140 by means of hinges 142. With the support frame 138 in the upright position (as shown), two containers 28 can be loaded into the support frame (only one container illustrated). The container may be held in place by a spring loaded bracket 144 or other suitable retaining means. When the pump, 24 is fitted in the outlet aperture of the container 28, the whole support frame 138 is pivoted to its horizontal position on the base 140 and the product is then ready for metering from the containers 28.

Figure 16:
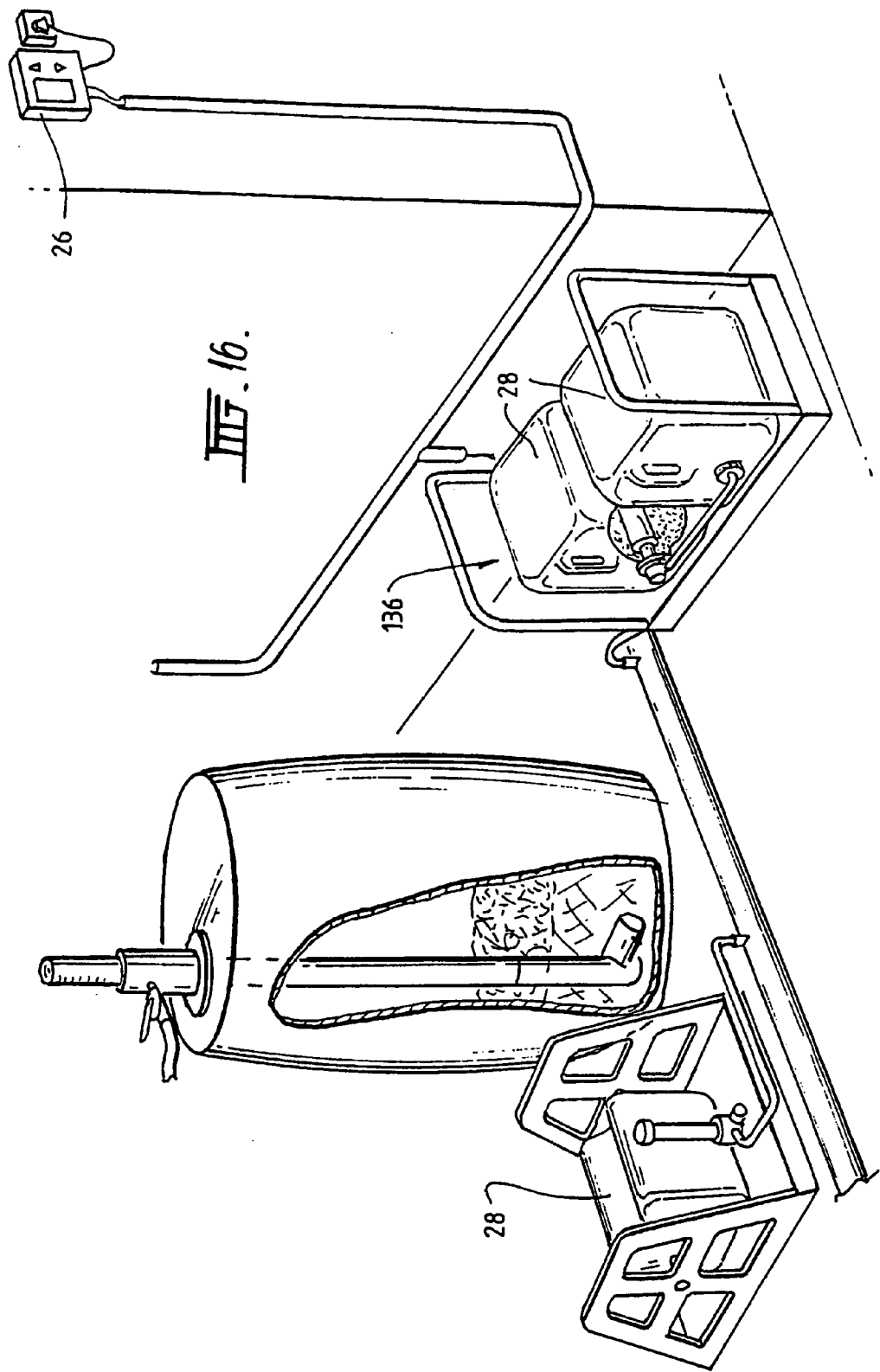
FIG. 16 illustrates a multi-head chemical metering pumping system in accordance with the present invention.

FIG. 16 illustrates a multi-head chemical metering pumping station which employs all three embodiments of the chemical metering pump in accordance with the invention. The two different types of cradle for supporting the liquid chemical container 28 are also illustrated. All four chemical metering pumps illustrated are controlled by a single electronic controller 26 which is remotely located as a wall-mounted unit. The cradle 136 is shown holding two containers connected to the one pump to operate in bank fashion to increase the capacity of liquid that can be pumped by the pump.

Figure 17:
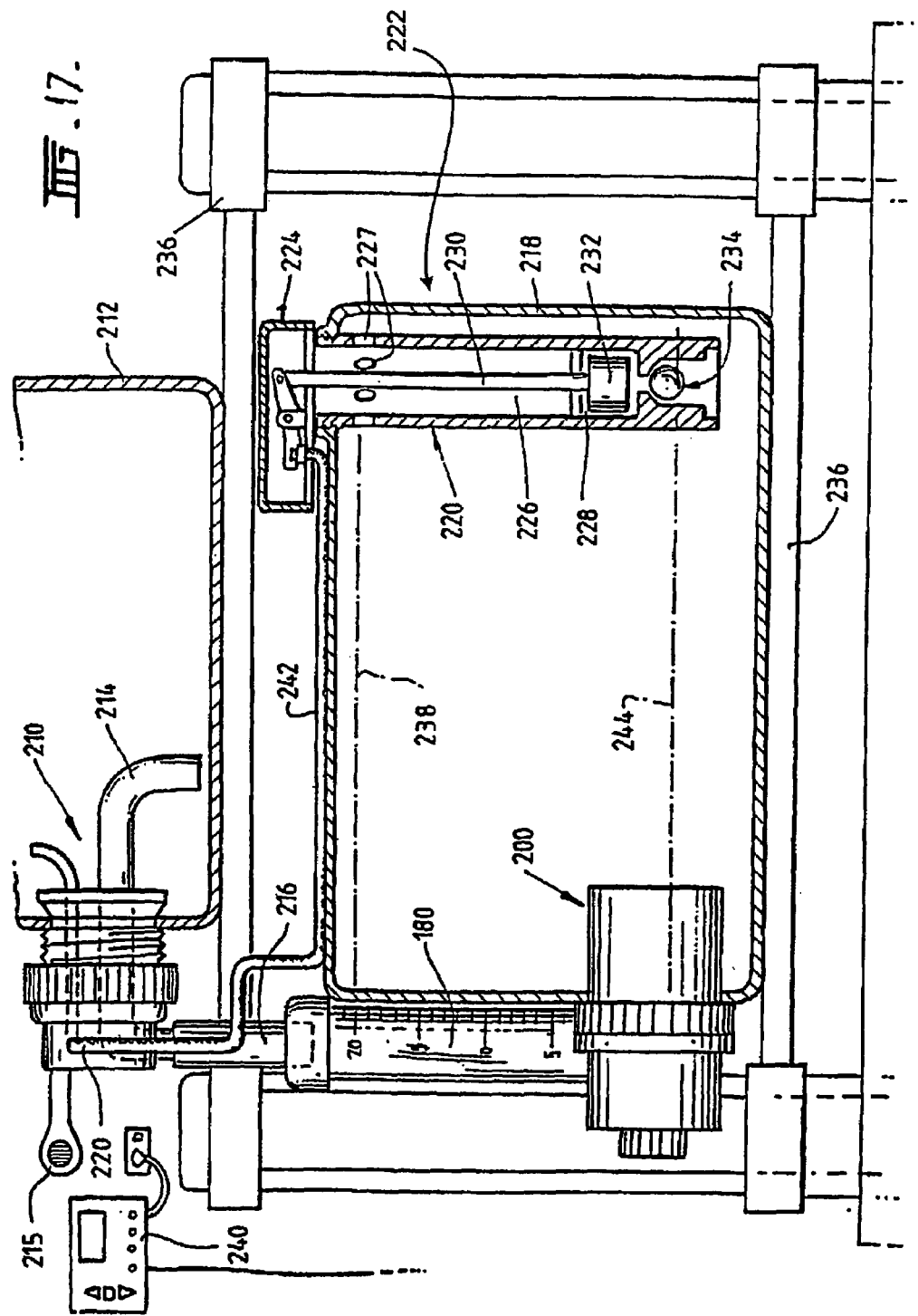
FIG. 17 illustrates a preferred embodiment of an auto-refill system for use in conjunction with the chemical metering pump of the present invention.

FIG. 17 illustrates a preferred embodiment of an auto-refill system for use in conjunction with the chemical metering pump of the present invention. The auto-refill system comprises a container drain tap 210 adapted to be fitted to the spout of any chemical container 212, which enables the container to be safely laid on its side to facilitate the syphoning of its contents. As in the case of previous embodiments the interior of the container 218 is vented to atmosphere through the pump body 200. The drain tap 210 comprises a scavenger tube 214 that extends into the container 212 with its opening close to the bottom of the volume of liquid in the container when laid on its side. Scavenger tube 214 ensures maximum fluid drainage during syphoning. A lever 215 can be manually operated to open and close the drain tap 210. An expandable spout attachment 216 is provided to connect the other end of the -14 scavenger tube 214, external to the container 212. Spout attachment 216 extends into the top of the sight tube 180, fitted to the pump 200 provided in connection with a liquid chemical container 218 provided below the container 212. The drain tap 210 also comprises an air-inducer outlet 220 which passes through the drain tap into the liquid chemical in container 212, and permits air to be induced into the container 212 under certain conditions (to be described below).

Container 218 is fitted with an vent valve 222 adapted to be fitted into a purpose built aperture in the side of the chemical container 218. Vent valve 222 comprises a level signaling device 224 at its upper end, an upper chamber 226 and a lower chamber 228. A connecting tube 242 is attached at one end to the level signaling device 224, and at its other end to the air inducer outlet 220 of the drain tap 210 for the back-up container 212. The level signaling device is associated with a valve which controls the communication between atmosphere and the interior of the connecting tube 242 and thus to the interior of the upper container via the air inducer tube 220. A spindle 230 extends from the level signaling device 224 down through the upper chamber 228 into the lower chamber 228 where it connects to a float 232 provided within the lower chamber 228. A ball float 234 is provided adjacent the lower chamber 228. A plurality of fluid ports 227 are provided near the top of the upper chamber 226 where liquid enters of the vent valve. The auto-fill system operates as follows.

With container 18 already laid on its side in its cradle 236, the liquid chemical in the container will be at the high mark 238. The chemical metering pump 200 is connected to a controller 240 ready to operate, and the vent valve 222 is installed into the threaded aperture in the side of container 218. A 4 mm connecting tube 242 is attached at one end to the level signaling device 224, and at its other end to the air inducer outlet 220 of the drain tap 210 for the back-up container 212. When the liquid chemical in the container will be at the high mark 238 the connecting tube 242 is closed by the valve associated with the level signaling device 224. The drain tap 210 is fitted to the outlet of the container 212 before the container 212 is laid on its side on the upper tier of the cradle 236. Spout attachment 216 is arranged so that liquid chemical drawn from container 212 via the scavenger tube 214 drains directly into the sight tube 180 of container 218.

Because the only source of air into the interior of upper container 212 (via air inducer outlet 220) is closed by the level signaling device 224, no liquid chemical will drain from container 212 at this stage.

Until the liquid within container 218 reaches the low mark 244, chemical metering pump draws liquid exclusively from the lower container 218. Both the upper chamber 226 and lower chamber 228 of the vent valve 222 are filled with liquid at this stage.

However, when the liquid chemical reaches the low mark 244, the ball float 234 in the vent valve 222 drops from its seat allowing the fluid within the upper chamber 226 and lower chamber 228 to escape from the vent valve 222. As pump 200 continues to discharge liquid from the container 218, the level of liquid within the auto-refill valve 222 will gradually fall until it reaches the lower chamber 228. At that point, float 232 begins to fall whereupon the level signaling device 224 is caused to pivot by means of spindle 230, allowing the free flow of air into the connecting tube 242 and thus into the upper container 212 and that flow of air via the air inducer outlet 220 into container 212 releases the air lock within that container, and liquid begins to drain out by the scavenger tube 214, spout attachment 216 and sight tube 180 into the lower container 218, where the liquid gradually accumulates until the upper container 212 is completely empty.

Because the volume of liquid (between the high mark and the low mark) in container 218 is already known, liquid from the upper 20 liter refill container 212 should never fill to the fluid ports 227 where liquid enters the upper chamber 226 of the auto-refill valve.

However, should the liquid level rise about the fluid ports 227, the auto-refill valve will fill with liquid, causing the float 232 to rise and closing off the air supply to the upper container 212 via connecting tube 242. When the contents of the upper container 212 have fully drained, it can be replaced, whilst the pump continues to operate from the now refilled lower container 218.

Figure 18:
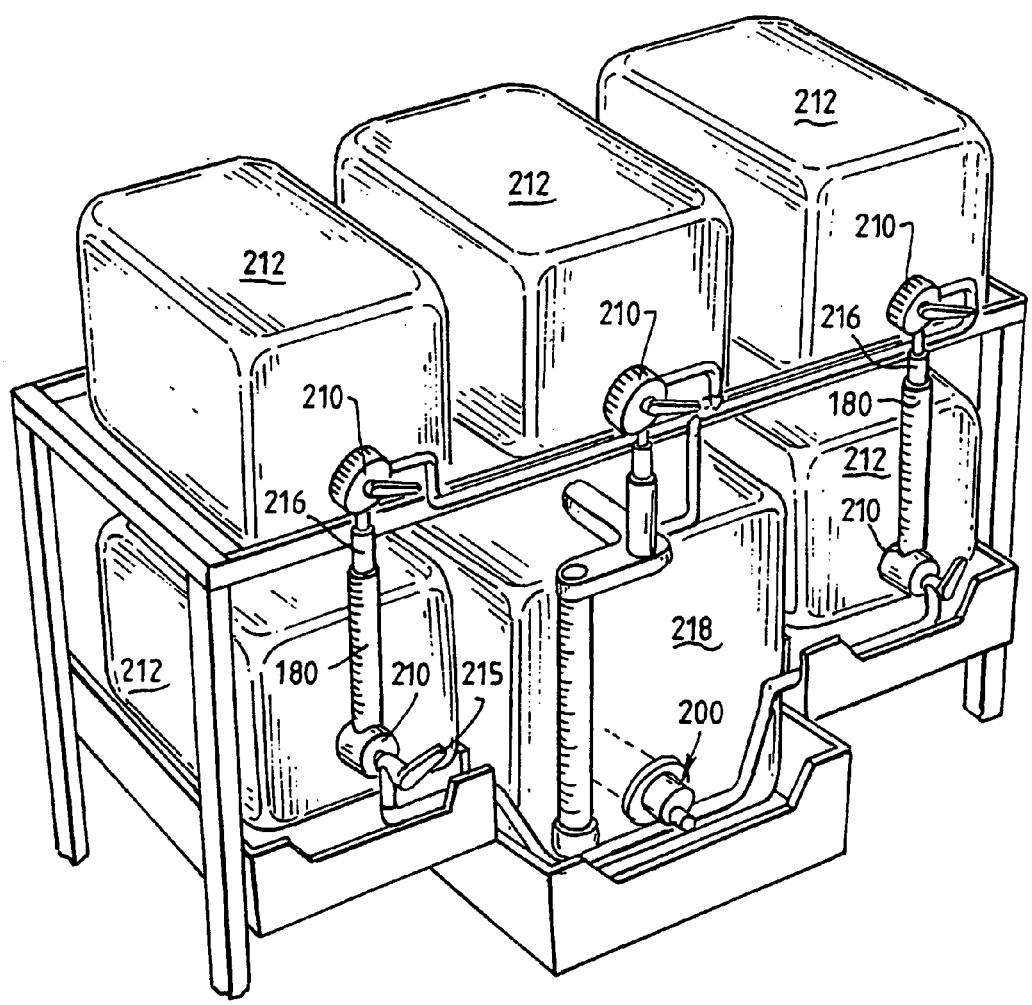
FIG. 18 illustrates banked and tiered chemical containers incorporating the auto-refill system of FIG. 17, mounted in a cradle system; and, FIGS. 19 (a), (b) and (c) illustrate a third embodiment of a calibration system for the chemical metering pump according to the present invention.

Advantageously, a bank of 20 liter refill containers 212 can be provided in a cradle system as illustrated in FIG. 18. Only the refill containers 212 on the upper level of the cradle need ever be replaced, on a rotating system.

Figure 20:
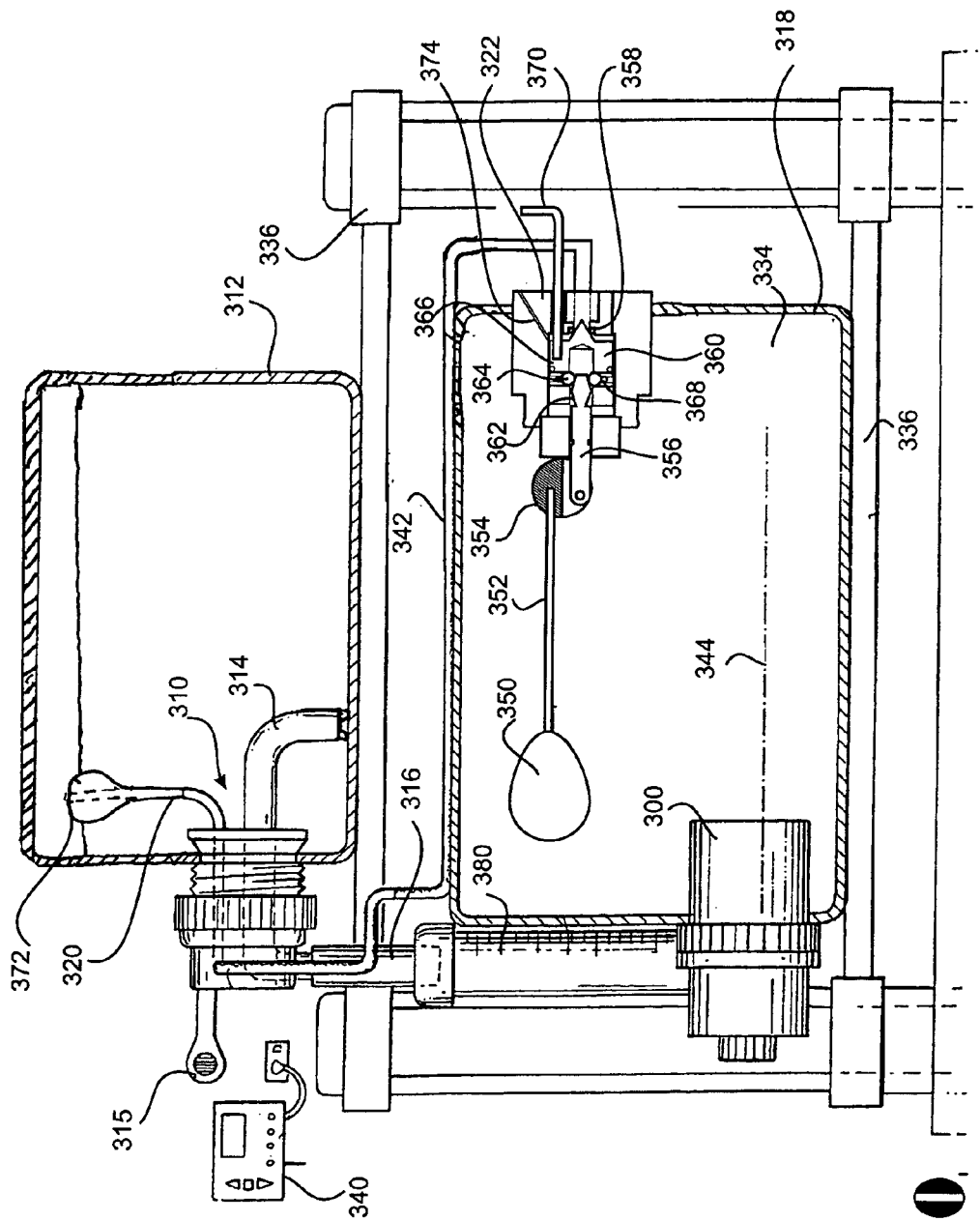
FIG. 20 illustrates an alternative preferred embodiment of an auto-refill system for use in conjunction with the chemical metering pump of the present invention.
Figure 21:
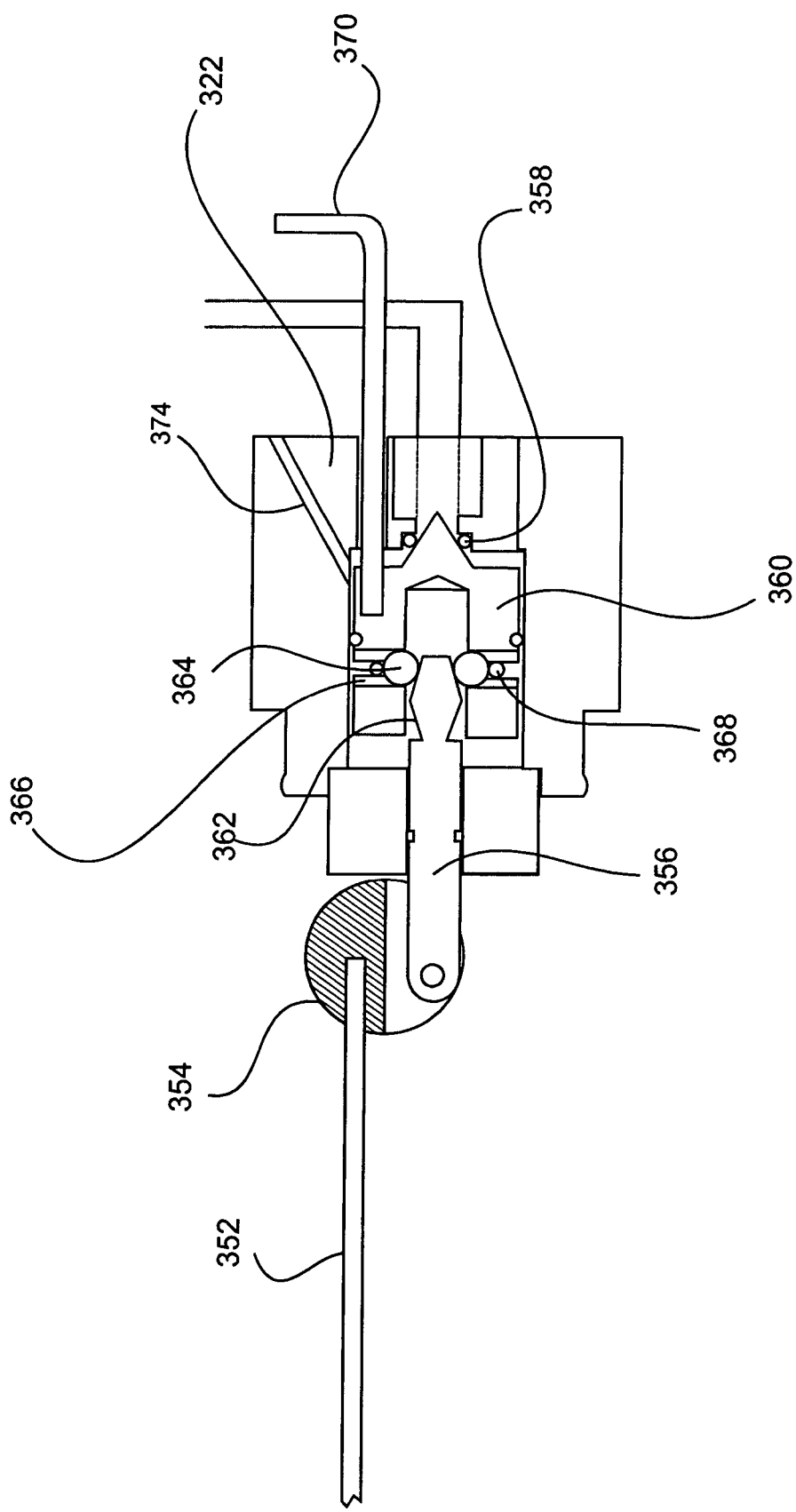
FIG. 21 is a schematic sectional side elevation of the vent valve of the embodiment shown at FIG. 20 with the valve member in the closed position.
Figure 22:
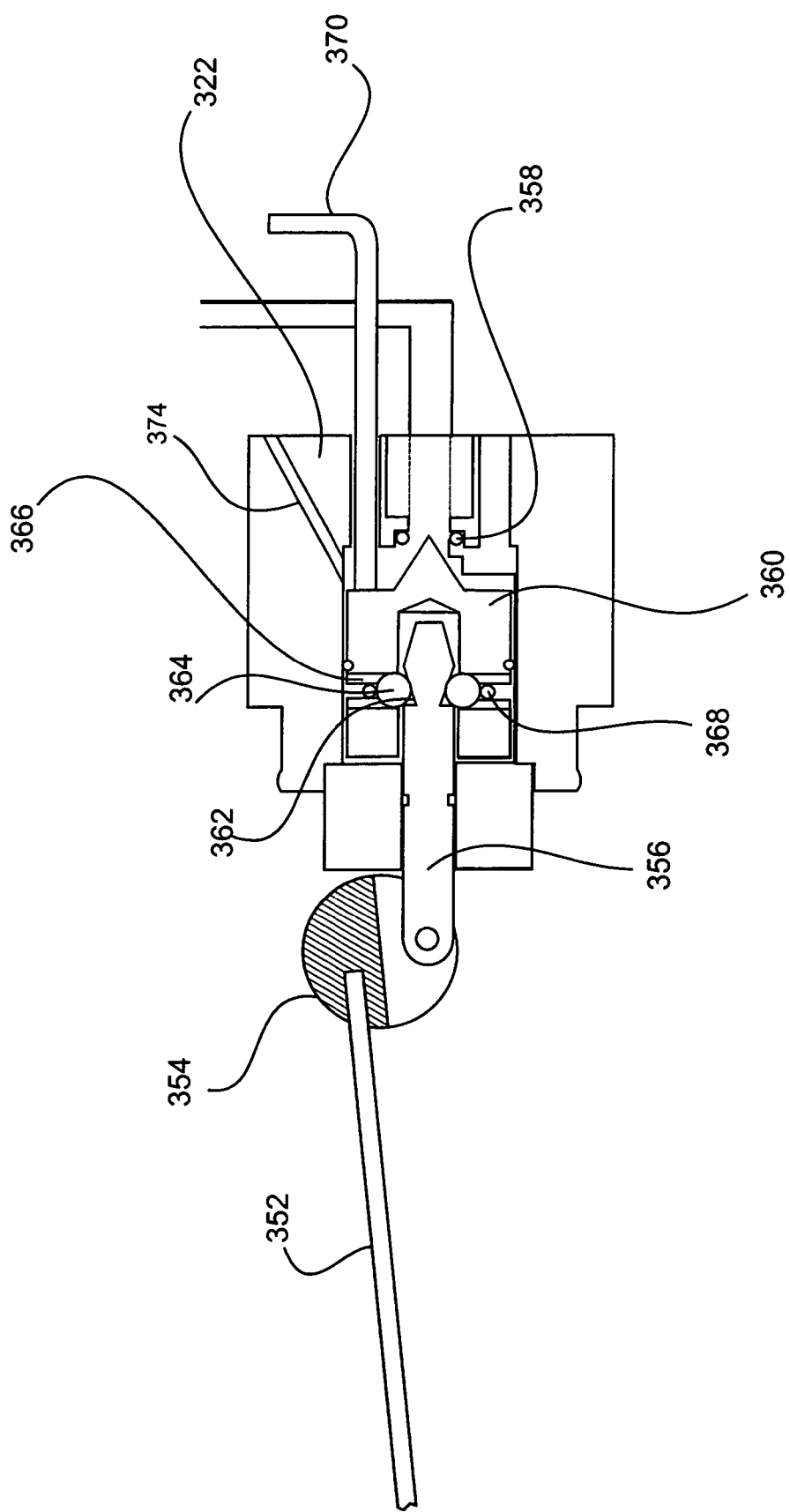
FIG. 22 is a schematic sectional side elevation of the vent valve of the embodiment shown at FIG. 20 with the valve member in the open position.

FIGS. 20, 21 and 22 illustrate an alternative preferred embodiment of the auto refill system that can be used with the chemical pump as previously described. The auto refill system generally corresponds with that of the embodiment as shown at FIGS. 17 and 18. The difference provided by the further embodiment relates to the means for sensing the level of liquid in the container 318 and the auto refill valve 322. As in the case of previous embodiments the interior of the container 318 is vented to the atmosphere, through the pump body 300. In the case of the further embodiment, the auto refill valve 322 comprises a float operated valve which is associated with a float 350. The float 350 is supported from one end of an arm 352, the other end of which is pivotally supported from the valve body of the auto refill valve 322. The other end of the arm 352 is associated with a cam member 354. A control rod 356 is pivotally supported from the cam member 354 and is slidably receivable within the bore extending into the valve body of the auto refill valve 332. The other end of the bore of the auto refill valve is connected to the second delivery conduit 342 and the body has a passage 374 which extends between the bore in the vicinity of the valve seat and the external face of the valve body which is to the exterior of the container 318. The other end of the bore is provided with a valve seat 358 and is closed by a valve member 360 which is slidably received within the bore of the body. The valve member is slidably received over the inner end of the control rod 356 which has its outer surface formed as a cam surface 362. The cam surface comprises a pair of divergent surfaces which are located in side-by side relationship to define a peak of maximum diameter, The valve member 360 bore is formed with a set of radial bores 366 which accommodate ball members 364 members which are slidably received within the radial bores provided in valve body 360 and are biased by a resilient O-ring 368 which is received in a circumferential groove in the outer face of the valve member which intersects the radial bores 366 whereby the O-ring overlies the balls 364 such that they are forced into sliding engagement with the cam surface 362 of the control rod.

As a result of the presence of the float 350 the control rod 356 is movable under the influence of the arm 352 according to the level of liquid contained within the container 318. When the container is filled, the control rod 356 is in the retracted position, as shown at FIGS. 20 and 21, and at this position the ball members 364, 368 are engaged with the axially outermost inclined surface of the cam surface 362 and therefore the engagement of the ball members with that surface will bias the valve member 360 into sealing engagement with the valve seat 358. As the float moves within the container 318 with the lowering of the liquid level within the container 318, the control rod 356 is forced inwardly into the valve member 360 and in so doing the biasing force on the valve member 360 forcing it into engagement with the valve seat 358 is increased. On the peak of the cam surface 362 engaging with the ball members 364, 368 they are located at their radially outermost position relative to each other. On further movement of the control rod into the valve member 360 the ball members will tend to move to the position of least resistance such that they are located at the inner end of the inner most inclined surface of the cam surface 362, as shown in FIG. 22. This movement serves to positively retract the valve member 360 away from the valve seat 358. This action results in a positive disengagement of the valve member 360 from the valve seat 358 at the precise position corresponding to the desired lowest level of liquid within the container 318. Once the valve member 360 has been moved to the open position, air is permitted to flow through the passage 374 into the bore of the valve body, the valve seat 358, the connecting tube 342, the air inducer tube 320 and into the interior of the upper container 312 which will allow the liquid in the upper container 312 to flow into the lower container 318 through the scavenger tube 314 and the sight tube 380. As the lower container 318 is filled, the control rod 356 is retracted from the valve member, and the peak of the cam surface moves past the ball members, meaning the valve member will be moved positively into engagement with the valve seat to prevent any further air flowing into the upper container 312. In addition the vent valve 322 is associated with a manual activating rod 370, so that the valve member 360 can be manually moved from the open position to the closed position or alternatively from the closed position to the open position as desired.

In addition the air inducer tube 320 within the upper container 312 is provided with a float 372 in order that the outlet of the air inducer tube will be maintained at a position above the liquid with the upper container.

The arrangement of the alternative preferred embodiment of the auto refill system as shown at FIGS. 20 to 22 can be used the arrangement as shown at FIG. 18

Figure 19:
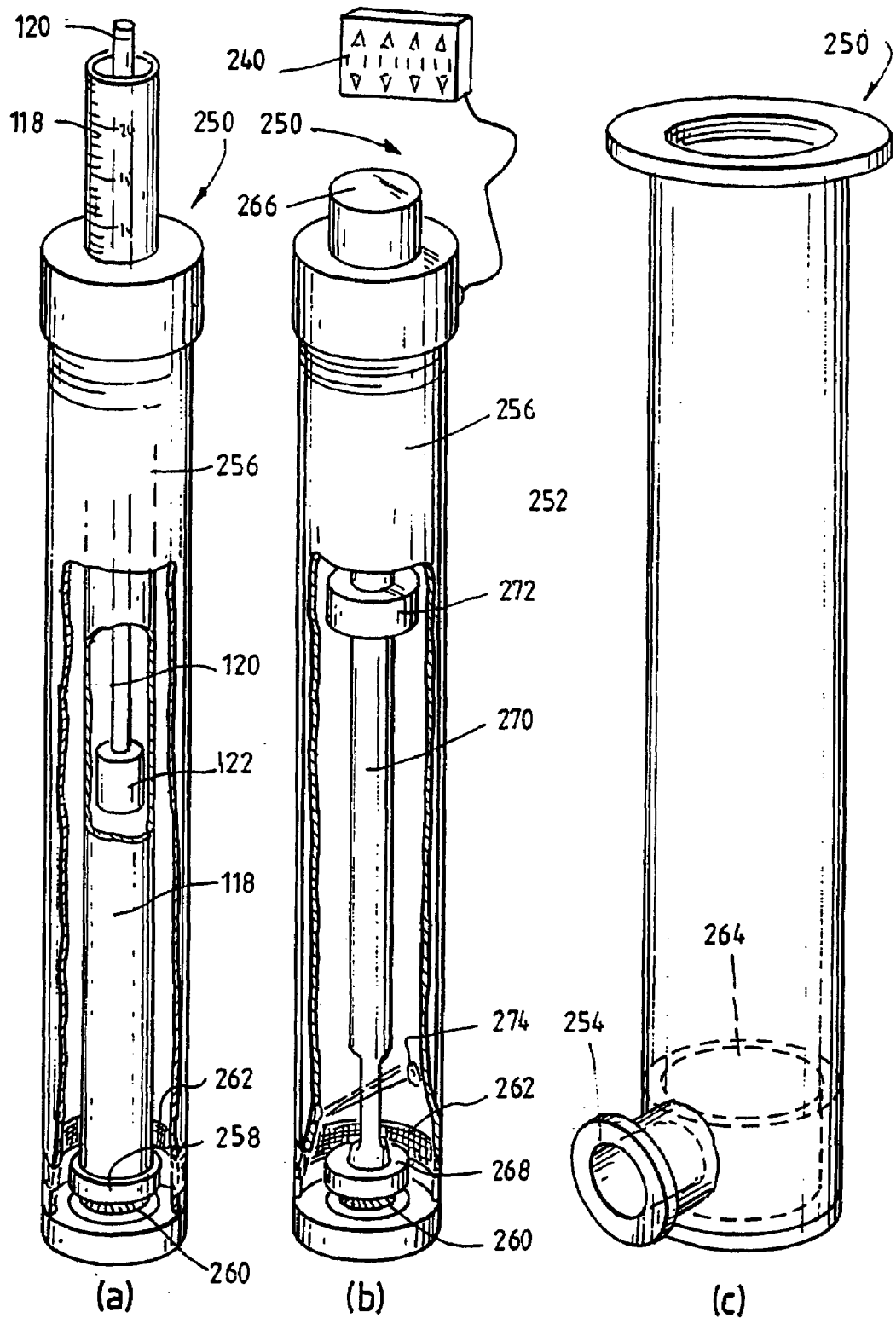

In FIG. 19, a third embodiment of a calibration system for the chemical metering pump according to the present invention is illustrated. FIG. 19(*a*) illustrates a manual calibration system, whereas FIG. 19(*b*) illustrates an auto calibration system. In both cases, the calibration system is designed to suit the application of the pump to a 200 liter drum, similar to that described above and illustrated in FIGS. 6 and 7. The manual calibration system shown in FIG. 19(*a*) is therefore similar to the second embodiment of the calibration system 10 illustrated in FIGS. 13 and 14, and therefore the similar parts shown in FIG. 19 are identified with the same reference numerals.

Both the auto and manual versions of the calibration system 250 shown in FIGS. 19(*a*) and (*b*) respectively, are in cartridge form and are housed in a shroud 252 having a flange 254 to which a chemical metering pump in accordance with the present invention is mounted. Both the manual and auto calibration options are provided in a cartridge housing 256, that is similar to the outer casing 116 of the second embodiment illustrated in FIG. 13. Within the cartridge housing 256 of the manual option, there is provided a hollow inner valve stem 118 and a calibration indicator rod 120 similar to that of the system illustrated in FIG. 13. A float 122 is provided at the lower-end of the calibration indicator rod 120, which is free to slide up and down within the inner valve stem 118. A valve 258 provided at the lower end of the valve stem 118 seats on a drum connector port 260 in its close position. With valve 258 in its open position (as shown in FIG. 19(*a*)), liquid chemical floods both the interior of the hollow inner valve stem 118 and the annular is volume between the cartridge housing 256 and the valve stem 118. However, when the valve stem 118 is lowered manually so that valve 258 seats against the drum connector port 260, liquid chemical can be drawn from within the hollow valve stem 118 only. The manual calibration system 250 illustrated in FIG. 19(*a*) is operated in a similar manner to the system I 10 illustrated in FIGS. 13 and 14 and will not be described again here. As with the embodiment illustrated in FIGS. 13 and 14, the main function of the manual calibration system is to enable a user to measure the rate at which the chemical metering pump discharges liquid chemical into a flow stream. It also allows the user to see the volume of liquid remaining in the drum from which the pump is discharging, ie a 200 liter dangerous goods drum—commonly known as a Mousser.

Advantageously, a simple wrap-around removable filter screen 262 is incorporated into the base of the cartridge housing 256. When the cartridge housing is inserted into the shroud 252 the screen 262 is received within a screen chamber 264 provided within the bottom of the shroud 262 adjacent the pump flange 254. Filter screen 262 prevents any contaminants from entering into the pump suction port, thus ensuring that the chemical metering pump can remain submerged in the drum at all times and minimizing operator contact with hazardous liquid chemicals.

In the auto calibration option illustrated in FIG. 19(*b*), a solenoid actuator 266 operates a valve 268 via a valve connecting rod 270. When an actuating signal is received by the solenoid actuator 266 from controller 240, connecting rod 270 moves the valve 268 downwards so that it seats against and seals off the drum connector port 260. A slidable float 272 is provided on the valve connecting rod 270 and is free to move up and down depending on the liquid level within the cartridge housing 256. An optical detector 274 is provided near the bottom of the cartridge housing 256 for detecting the position of the float 272. The auto calibration system 250 operates as follows.

During normal operation when the chemical metering pump is running, the connecting rod 270 remains in its up position and liquid is drawn into the system through the drum connector port 26. However, when a signal is transmitted from the controller 240 to commence the calibration cycle, solenoid actuator 266 is activated and connecting rod 270 forces valve 268 to seal off the drum connector port 260. In this position, the chemical metering pump will draw liquid directly from within the cartridge housing 256. As the liquid level descends, the float 272 also moves downwards and will eventually interrupt the light beam of optical detector 274. At the same time that solenoid actuator 266 is actuated, a first timer within the controller 240 is activated. When the float 272 is detected by the detector 274, a detection signal is transmitted to the controller 240 which stops the first timer and records the total time elapsed from commencement. It also triggers a second timer. Once the float 272 drops below the light beam of detector 274, the second timer also stops and controller 240 records the time elapsed from its commencement. At this point, solenoid actuator 266 is deactivated, causing the valve 268 to be lifted from the drum connector port 260. This enables the liquid chemical from the drum to re-fill the cartridge housing 256 until it reaches the same level as the contents of the drum.

Controller 240 uses the time elapsed from the first timer, together with the frequency of the chemical metering pump, to calculate the volume pumped and transmits this data to a data logger or interface computer. Using the volume pumped and the time recorded from the first timer, the controller is also able to calculate the volume of liquid remaining in the drum and also relays this information to a sight bar indicator, and/or the data logger or interface computer. Controller 240 is also able to monitor the operation of the 'auto calibration system 250, and to detect the following operating conditions:

| Condition | ID Code | Primary Action | Secondary Action |
|---|---|---|---|
| Float remains idle or fails to interrupt the beam within a predetermined time | Pump failure: | Alarm | Switch to Standby |
| Float interrupts the beam before a predetermined time is reached | Excessive discharge | Alarm | Shut down |
| Float fails in interrupt the beam | Failed to | Adjust | Up/down |

-continued

| Condition | ID Code | Primary Action | Secondary Action |
|---|---|---|---|
| outside a set band time | reach set point | | recalibrate |
| Float interrupts beam instantly | Low volume | Alarm | Switch to standby |

From the above description of several embodiments of the chemical metering pump it will be apparent that it provides a number of significant advantages over prior art chemical metering pumps. In particular, it substantially eliminates the need for "double handling" as it enables liquid chemical to be metered directly from the transport/storage containers in which it is delivered to the water treatment plant. The pump can be readily modified to suit different sized containers. In addition, multiple pumps can be controlled using a single remote electronic controller.

Throughout this specification (including the claims if present), unless the context requires otherwise, the word "comprise", or variations such as "comprises" or "comprising", will be understood to imply the inclusion of a stated integer or group of integers but not the exclusion of any other integer or group of integers.

Numerous variations and modifications will suggest themselves to persons skilled in the arts relating to chemical metering pumps, in addition to those already described, without departing from the basic inventive concepts. For example, any suitable actuator may be employed in the chemical metering pump for driving the diaphragm in a reciprocating motion, for example, an hydraulic or pneumatic actuator. All such variations and modifications are to be considered within the scope of the present invention, the nature of which is to be determined from the foregoing description and the appended claims.

The invention claimed is:

1. A liquid delivery system comprising:
 a first reservoir having a first outlet, a lower portion, an upper portion, and a liquid delivery means for delivery of liquid from the first reservoir via the first outlet, the first outlet located at the lower portion of the first reservoir, the first reservoir having a vent enabling the upper portion of an interior of the first reservoir to be open to atmosphere,
 a second reservoir located above the first reservoir and having a second outlet and a lower portion, the second outlet located in the lower portion of the second reservoir,
 a first delivery conduit connecting the second outlet to the first reservoir,
 a second delivery conduit interconnecting the upper portion of the interior of the first reservoir with an upper portion of an interior of a second reservoir located above the level of liquid in the second reservoir,
 a vent valve controlling communication through the second delivery conduit,
 a level sensor provided with the first reservoir and adapted to sense the level of the liquid in the first reservoir, the sensor associated with the vent valve to cause the vent valve to open upon the level of the liquid in the first container falling below a first predetermined level, and to close the vent valve on the level of liquid in the first reservoir rising above a second predetermined level, and
 wherein the first predetermined level is lower than the second predetermined level.

2. A liquid delivery system as claimed at claim 1 wherein the second reservoir comprises a plurality of second reservoirs, each second reservoir connected to the first reservoir by a first delivery conduit and each connected to the first reservoir through said second delivery conduit.

3. A liquid delivery system as claimed claim 1 wherein the first reservoir comprises a plurality of containers each having a common upper level and each having a first outlet wherein one container has one first outlet lower than the other first outlets, the liquid delivery means being associated with the one first outlet and the other first outlets being connected to the one container.

4. A liquid delivery system as claimed at claim 3 wherein each container is associated with the second reservoir.

5. A liquid delivery system as claimed at claim 1 wherein the liquid delivery means comprises an adaptor which is adapted to sealingly close the first outlet, the adaptor supporting a housing, said housing having a pumping chamber which is at least in part defined by a flexible diaphragm, the space defined by a face of the diaphragm and which is remote from the pumping chamber being vented to atmosphere, an inlet providing communication between the interior of the first reservoir and the pumping chamber and an outlet providing communication between the pumping chamber and a delivery line, wherein in use said pumping chamber is located in relation to the inlet to be constantly filled with said liquid, the housing supporting an actuator operatively connected to the diaphragm through said space and adapted to reciprocate to cause flexing of the diaphragm in the pumping chamber to induce liquid flow from the inlet to the pumping chamber and from the pumping chamber to the outlet, a control means located remote from the container and adapted to control the actuator.

6. A liquid delivery system as claimed at claim 5 wherein the adaptor comprises a closure which is adapted to close the outlet and a support which when in position extends from the outlet into the first reservoir to terminate proximate a wall of the first reservoir which in use is to be lowermost the housing supported from an innermost end of the support, said support accommodating the delivery line.

7. A liquid delivery system as claimed at claim 5 wherein the adaptor comprises a closure which is adapted to close the outlet, the housing supported from an external face of the closure, the inlet opening to an internal face of the closure.

8. A liquid delivery system as claimed at claim 5 wherein the adaptor comprises a closure which is adapted to close the inlet, the housing supported from the closure to extend inwardly into the interior of the first reservoir from the closure, the external face of the closure being adapted to support the delivery line.

9. A liquid delivery system as claimed at claim 5 wherein the actuator comprises a solenoid having a core operatively connected to the diaphragm, a control adapted to cause periodic activation of the solenoid and consequent reciprocation of the core.

10. A liquid delivery system as claimed at claim 5 wherein the space is associated with a vent duct which extends between the exterior of the container and the space.

11. A liquid delivery means as claimed at claim 10 wherein the vent duct accommodates electrical conductors providing connection between the control and actuator.

12. A liquid delivery system as claimed at claim 1 wherein the reservoirs are supported in a cradle, the cradle pivotally supported from a base to be movable between a first position at which the first outlet is uppermost and a second position at which the first outlet is located towards the lower extent of the first reservoir when at the second position and the second reservoir is supported from above the first reservoir.

13. A liquid delivery system as claimed at claim 12 wherein the cradle is displaced through substantially 90° in its movement between the first and second positions.

14. A liquid delivery system as claimed at claim 12 wherein the cradle is adapted to support a plurality of reservoirs in a side by side relationship.

15. A liquid delivery means as claimed at claim 1 wherein the liquid delivery means comprises an adaptor which is adapted to sealingly close the first outlet, the adaptor supporting a housing, said housing having an inlet, an outlet and a cavity which accommodates a flexible diaphragm, the diaphragm at least partially defining a pumping chamber within the cavity to one side of the diaphragm and a space within the cavity to the other side of the diaphragm, the space being vented to atmosphere, the inlet opens directly into the interior of the first reservoir and the pumping chamber and the outlet providing communication between the pumping chamber and a delivery line, the inlet and the outlet each having a one way valve, wherein in use the housing is located such that the housing is below an intended lowermost level of the liquid in the first reservoir and the outlet is located above the inlet; and the housing supporting an actuator and an associated actuating element which is operatively connected to the diaphragm through said space, said actuator being caused to reciprocate as result of a sequential activation of the actuator to cause flexing of the diaphragm in the pumping chamber to induce liquid flow from the inlet to the pumping chamber and from the pumping chamber to the outlet of the housing, a control means located remote from the first reservoir and adapted to control the actuator.

16. A liquid delivery system as claimed at claim 15 wherein the adaptor comprises a closure which is adapted to close the outlet of the first reservoir, the closure comprising an annular member which is receivable over the outlet and which concentrically receives the housing to support the housing from the outlet of the first reservoir.

17. A liquid delivery system as claimed at claim 15 wherein the adaptor comprises a closure which is adapted to close the first outlet of the first reservoir, the housing supported from the closure to extend inwardly into the interior of the first reservoir from the closure, an outermost portion being adapted to support the delivery line.

18. A liquid delivery system as claimed at claim 15 wherein the housing is formed of a material which is chemically resistant to the liquid.

19. A liquid delivery system as claimed at claim 15 wherein the space is associated with a vent duct which extends between the exterior of the first reservoir and the space.

20. A liquid delivery system as claimed at claim 15 wherein said inlet and outlet are located to one side of the cavity, the actuator located to another side of the cavity, an insert receivable in the cavity, said insert accommodating the diaphragm and providing the pumping chamber and space.

21. A liquid delivery system as claimed at claim 20 wherein the insert is capable of being replaced by other inserts each defining a pumping chamber of a differing volume.

22. A liquid delivery system as claimed at claim 20 wherein the insert comprises a first portion accommodating the diaphragm and defining the space and a second portion having a recess which is receivable over the diaphragm to define the pumping chamber.

23. A liquid delivery system as claimed at claim 15 wherein in use the inlet is located below the pumping chamber and the outlet is located above the pumping chamber.

24. A liquid delivery system as claimed at claim 23 wherein the inlet is connected to the pumping chamber by a first duct and the pumping chamber is connected to the outlet by a second duct wherein when in use the first and second ducts are upwardly inclined.

25. A liquid delivery system as claimed at claim 15 wherein a reservoir is located intermediate the inlet and the pumping chamber and an inlet port is provided between the reservoir and the pumping chamber at a position which in use is to be located in the lower portion of the reservoir, the upper portion of the reservoir being connected to the chamber.

26. A liquid delivery means as claimed at claim 25 wherein in use the inlet port is downwardly inclined from the reservoir to the pumping chamber.

27. A liquid delivery system as claimed at claim 1 wherein the liquid delivery means comprises:
an adaptor which is adapted to sealingly close the first outlet, the adaptor supporting a housing;
said housing having an inlet, an outlet and a cavity which accommodates a flexible diaphragm, the diaphragm at least partially defining a pumping chamber within the cavity to one side of the diaphragm and a space within the cavity to an other side of the diaphragm, the space being vented to atmosphere;
the inlet opens directly into the interior of the first reservoir and the pumping chamber and the outlet providing communication between the pumping chamber and a delivery line, the inlet and the outlet each having a one way valve, wherein in use the housing is located such that the housing is below an intended lowermost level of the liquid in the reservoir and the outlet is located above the inlet;
the housing supporting a solenoid and an associated actuating element which is operatively connected to the diaphragm through said space, said actuator being caused to reciprocate as result of the sequential activation of the solenoid to cause flexing of the diaphragm in the pumping chamber to induce liquid flow from the inlet to the pumping chamber and from the pumping chamber to the outlet of the housing, a control means located remote from the container and adapted to control the solenoid; and
a calibration arrangement comprising a bypass duct connected to the outlet, a calibration chamber connected to a bypass duct, an adjustable valve which is adapted to vary the communication between the outlet and the calibration chamber, the calibration chamber in use supported to be exterior of the first reservoir and to extend above the housing to have a height at least equal to the maximum height of a liquid in the first reservoir, the upper portion of the calibration chamber is open to the atmosphere, the inlet communicating with the calibration chamber, a measuring means provided in association with the calibration chamber to enable a volume of a liquid in the calibration chamber to be monitored, the calibration chamber being connected to the inlet, the arrangement further comprising a control valve associated with the inlet and adapted to control the flow of fluid from the container to the pumping chamber.

28. A liquid delivery system as claimed at claim 27 wherein the calibration chamber comprises an upstanding hollow column, and the calibration chamber is formed at least in part to be transparent to enable the liquid level in the column to be visually observed, the lower end of the column being connected to the bypass duct.

29. A liquid delivery system as claimed at claim 27 wherein the measuring means comprise spaced graduations along the column which are representative of the volume of the liquid in the calibration chamber.

30. A liquid delivery system as claimed at claim 27 wherein a central axis of the column is substantially upright.

31. A liquid delivery system as claimed at claim 20 wherein the insert comprises a first portion accommodating the diaphragm and defining the space and a second portion having a recess which is receivable over the diaphragm to define the pumping chamber.

32. A liquid delivery system as claimed at claim 27 wherein a reservoir is located intermediate the inlet and the pumping chamber and an inlet port is provided between the reservoir and the pumping chamber at a position which in use is to be located in the lower portion of the reservoir, the upper portion of the reservoir being vented to atmosphere.

33. A liquid delivery system as claimed at claim 27 wherein the housing is associated with a chamber which in use is supported to be exterior of the container and to extend above the housing to have a height at least equal to the maximum height of the liquid in the first reservoir, the upper portion of the chamber is open to the atmosphere, the reservoir communicating with the chamber, the outlet communicating with the chamber through a variable valve which is able to vary a degree of communication.

34. A liquid delivery system as claimed at claim 32 wherein the outlet is connected to the chamber through a duct which opens into the chamber at a position at least equal to the maximum height.

35. A liquid delivery system as claimed at claim 27, wherein the housing is wholly accommodated within the first reservoir.

36. A liquid delivery means as claimed at claim 27, wherein the housing is partially accommodated within the first reservoir.

37. A liquid delivery means as claimed at claim 5 wherein the adaptor comprises a closure which is adapted to close the outlet of the first reservoir, the housing supported from the closure to extend inwardly into the interior of the first reservoir from the closure, an outermost portion of the housing being adapted to support the delivery line.

38. A liquid delivery means as claimed at claim 15 wherein the adaptor comprises a closure which is adapted to close the outlet of the first reservoir, the closure comprising an annular member which is receivable over the outlet and which concentrically receives the housing to support the housing from the first outlet.

* * * * *